(12) United States Patent
Chandra et al.

(10) Patent No.: US 12,417,319 B2
(45) Date of Patent: Sep. 16, 2025

(54) MULTI-CHIP SECURE AND PROGRAMMABLE SYSTEMS AND METHODS

(71) Applicant: Lattice Semiconductor Corporation, Hillsboro, OR (US)

(72) Inventors: Srirama Chandra, Portland, OR (US); Tim Vogt, San Jose, CA (US); Mamta Gupta, Fremont, CA (US); Sharath Raghava, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 323 days.

(21) Appl. No.: 18/331,114

(22) Filed: Jun. 7, 2023

(65) Prior Publication Data
US 2023/0315913 A1 Oct. 5, 2023

Related U.S. Application Data

(63) Continuation of application No. PCT/US2021/062487, filed on Dec. 8, 2021.

(60) Provisional application No. 63/122,910, filed on Dec. 8, 2020.

(51) Int. Cl.
*G06F 21/64* (2013.01)
*G06F 21/57* (2013.01)

(52) U.S. Cl.
CPC ............ *G06F 21/64* (2013.01); *G06F 21/572* (2013.01)

(58) Field of Classification Search
CPC ........ G06F 21/64; G06F 21/76; G06F 21/572; G06F 21/575
See application file for complete search history.

(56) References Cited

U.S. PATENT DOCUMENTS

| | | | |
|---|---|---|---|
| 7,069,452 B1 * | 6/2006 | Hind | G06F 21/572 713/1 |
| 9,152,794 B1 * | 10/2015 | Sanders | H04L 9/0877 |
| 9,165,143 B1 * | 10/2015 | Sanders | G06F 21/575 |
| 9,230,112 B1 * | 1/2016 | Peterson | G06F 21/76 |

(Continued)

FOREIGN PATENT DOCUMENTS

| | | |
|---|---|---|
| WO | WO 2019/217934 A1 | 11/2019 |
| WO | WO 2020/243367 A1 | 12/2020 |

*Primary Examiner* — Shanto Abedin
(74) *Attorney, Agent, or Firm* — Haynes and Boone, LLP

(57) ABSTRACT

Various techniques are provided to implement multi-chip secure and programmable systems and methods. In one example, a multi-chip module system for providing an integrated programmable logic functionality and security functionality. The multi-chip module system includes a first die including a programmable logic device (PLD) configured to provide at least a portion of the programmable logic functionality. The multi-chip system further includes a second die including a security engine configured to perform at least a portion of the security functionality. The security engine is further configured to receive, from the first die, data associated with a first and second configuration image; perform a read operation on a memory for the second configuration image based on the data; and authenticate the second configuration image. The multi-chip system further includes a configuration engine configured to program the PLD according to the first configuration image. Related devices and methods are provided.

20 Claims, 17 Drawing Sheets

(56) References Cited

U.S. PATENT DOCUMENTS

| | | |
|---|---|---|
| 2019/0042514 A1 | 2/2019 | Enamandram et al. |
| 2019/0042752 A1* | 2/2019 | Mihm .................. G06F 21/575 |
| 2019/0044515 A1 | 2/2019 | Gutala et al. |
| 2019/0044575 A1* | 2/2019 | Assem .................. H04W 4/023 |
| 2019/0318131 A1* | 10/2019 | Lulic .................... H04L 9/0897 |
| 2020/0136906 A1 | 4/2020 | Guim Bernat et al. |
| 2020/0167506 A1* | 5/2020 | Iyer ........................ G06F 21/76 |
| 2021/0081536 A1* | 3/2021 | Zhang ................. G06F 11/3656 |

\* cited by examiner

MULTI-CHIP SECURE AND PROGRAMMABLE SYSTEMS AND METHODS

CROSS-REFERENCE TO RELATED APPLICATIONS

This patent application is a continuation of International Application No. PCT/US2021/062487, filed Dec. 8, 2021 and entitled "Multi-Chip Secure and Programmable Systems and Methods", which is claimed for the benefit of and incorporated herein by reference in its entirety.

International Application No. PCT/US2021/062487 claims the benefit of and priority to U.S. Provisional Patent Application No. 63/122,910, filed on Dec. 8, 2020 and entitled "Secure Field Programmable Multi-Chip Module and Methods," which is incorporated herein by reference in its entirety. International Application No. PCT/US2021/062487 is related to U.S. Provisional Patent Application Nos. 62/756,001; 62/756,021; 62/756,015; and 62/846,365, each of which is incorporated by reference in its entirety.

TECHNICAL FIELD

The present invention relates generally to programmable logic devices and, more particularly, to multi-chip programmable systems and methods.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources.

Customers for PLDs often dedicate considerable resources to developing configurations for their chosen PLD type and/or capability and protecting the configuration data and protecting against subversion of a desired operation or capability tied to the chosen PLD and/or developed configuration has become of paramount importance to many customers for PLDs. Thus, there is a need in the art for systems and methods to manufacture, protect, distribute, and/or upgrade PLDs and PLD configurations, particularly in the context of trusted computing applications and trusted computing architectures.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
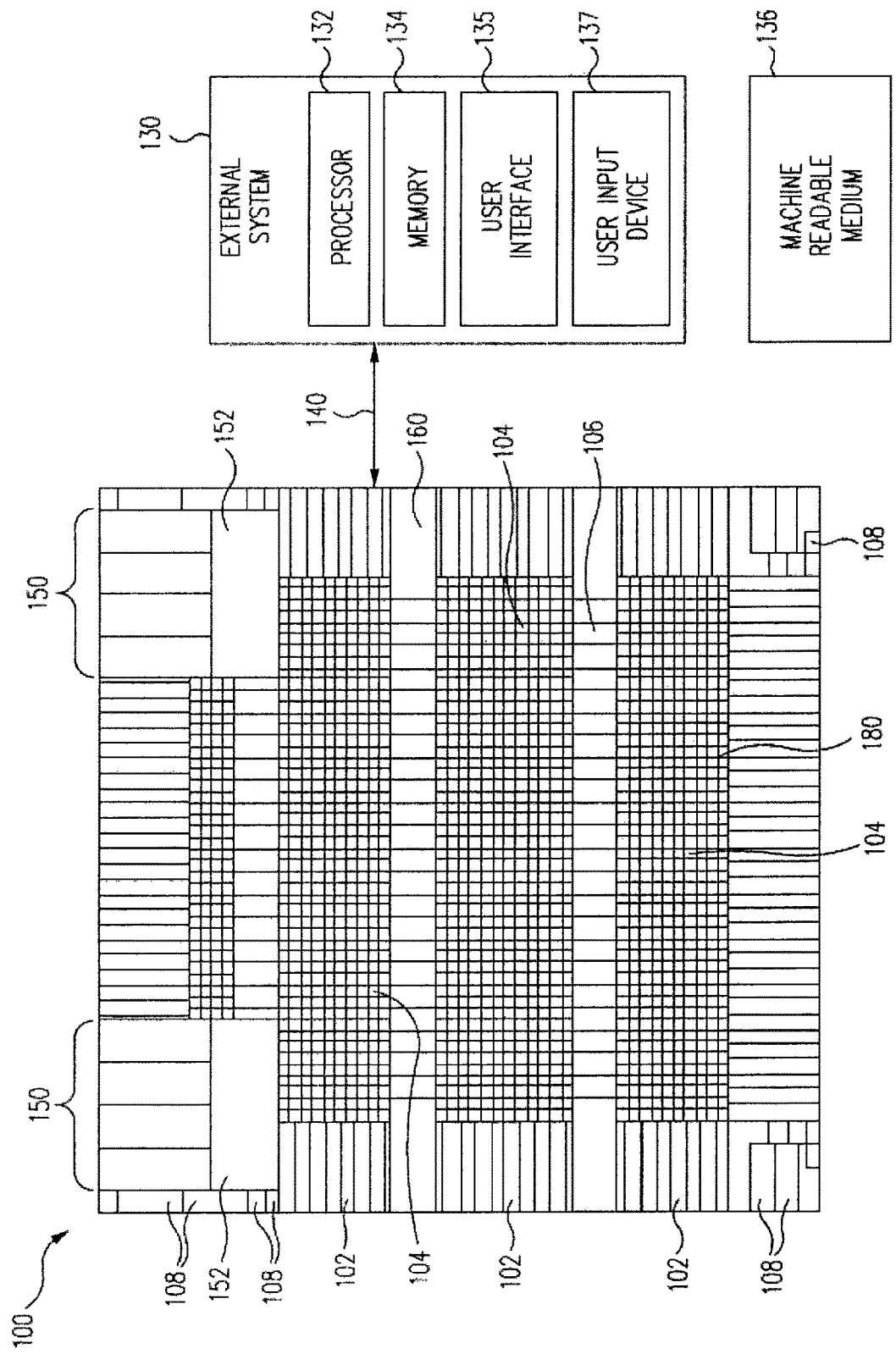
FIG. 1 illustrates a block diagram of a PLD in accordance with an embodiment of the disclosure.

In accordance with various embodiments set forth herein, techniques are provided to implement multi-chip module (MCM) systems using configurable/programmable logic components, such as components of one or more programmable logic devices (PLDs). Such multi-chip module systems may also be referred to as multi-die systems, multi-die module systems, and multi-die modules. The multi-chip module systems may be used for/in trusted computing applications and architectures. The multi-chip module systems may be used to perform various security operations for a trusted platform, for example, including securely configuration and/or booting such platform/user device. For example, in some embodiments, a PLD includes a plurality of programmable logic blocks (PLBs), memory blocks, digital signal processing blocks, input/output blocks, and/or other components that may be interconnected in a variety of ways to implement a desired circuit design and/or functionality. A circuit design may be represented, at least in part, by a netlist, which can describe components and connections therebetween in the design. For example, a user design may be converted into and/or represented by a netlist including a set of PLD components (e.g., configured for logic, arithmetic, clocking, and/or other hardware functions) and associated interconnections available in a PLD. The netlist may be used to place components and/or route connections for the design (e.g., using routing resources of the PLD) with respect to a particular PLD (e.g., using a simulation of the desired circuit design constructed from the netlist). In general, a PLD (e.g., an FPGA) fabric includes various routing structures and an array of similarly arranged logic cells arranged within programmable function blocks (e.g., PFBs and/or PLBs). The goal in designing a particular type of PLD is generally to maximize functionality while minimizing area, power, and delay of the fabric.

The multi-chip module systems may control applications to secure system firmware across a wide range of applications such as computing, industrial control, communications (e.g., switches, routers, servers), etc. Such security may protect against data theft, data modification, and device tampering and hijacking. The multi-chip systems may include various additional "hard" engines or modules configured to provide a range of security functionalities to provide configurable trusted computing functionalities and/or architectures. Routing flexibility and configurable function embedding may be used when synthesizing, mapping, placing, and/or routing a user design into a number of PLD components. As a result of various user design optimization processes, which can incur significant design time and cost, a user design can be implemented relatively efficiently, thereby freeing up configurable PLD components that would otherwise be occupied by additional operations and routing resources. In some embodiments, an optimized user design may be represented by a netlist that identifies various types of components provided by one or more die of the multi-chip system and their associated signals. In embodiments that produce a netlist of the converted user design, the optimization process may be performed on such a netlist. Once optimized, such configuration may be encrypted and signed and/or otherwise secured for distribution to programmable portions of a multi-chip system.

The multi-chip system may provide non-volatile memory through access control, cryptographically detect and prevent boot up from malicious code, and recover to a latest trusted firmware in the event of corruption. Moreover, the multi-chip system may dynamically reconfigure I/O ports at any time to minimize the system's attack surface. Reprogrammability of the multi-chip system may allow system enhancements after equipment deployment in the field. The reprogrammability may allow for dynamic control of an attack surface, update of the multi-chip system to render recent firmware attacks obsolete, and so forth. The multi-chip system provides robust security capability while providing programmability. As part of a hardened configuration engine, the multi-chip system supports code authentication to confirm that each configuration loaded has the appropriate digital signature. Furthermore, the multi-chip system provides additional on-chip flash memory to store multiple configurations (e.g., two configurations in some cases) of the device at any time. This multiple-boot capability (e.g., dual-boot capability) allows the system to default to the on-device back-up configuration in the event of a compromise.

In some embodiments, a portion of a multi-chip system may be, or may be considered to be, fixed function (e.g., not changeable, immutable) whereas another portion of the multi-chip system may be programmable/configurable (e.g., changeable, adjustable, mutable). In some cases, even though a portion of the multi-chip system may be presented to an end user as being fixed function, this portion may instead by programmable. Such programmability may allow updates and/or changes in the field to functionality (e.g., IP features) implemented by the portion. In some cases, the portion presented to the user as being fixed function may be a portion of the multi-chip system that provides a security block (e.g., an embedded security block) to provide a security engine of the multi-chip system. For example, the security block may be programmable to provide new algorithms and/or new features deployable by the security block. The security engine may operate as a platform firmware resiliency (PFR) manager for components of the multi-chip module system. In some cases, the portion may be implemented on one die of the multi-chip system. In some cases, the embedded security block may provide a hardware root of trust and hardened cryptographic capabilities to address security threats. In some cases, the multi-chip system may provide bit stream encryption to ensure design security and protection against theft of IP. The multi-chip system may include non-volatile memory (NVM), such as flash memory.

In some embodiments, the multi-chip system includes a PLD die, such as an integrated circuit (IC) with an FPGA fabric, and a separate die. The PLD die may implement customer control functions and may contain a root of trust. In some cases, the root of trust may be automatically added by a system builder that produces a configuration bitstream for a user-defined portion of functions implemented in the PLD fabric. For example, the root of trust may be implemented in an FPGA fabric, and bitstream data for such root of trust may be added to the PLD configuration data that contains user configuration data without explicit specification/instruction from the user to include the root of trust. The separate die may implement a security block/engine (e.g., embedded security block) to provide security functions. In some cases, the separate die may be a PLD die having a programmable logic functionality, such as an FPGA. Such an FPGA may be a fully functional separate FPGA. In such cases, the configuration bitstream for configuring the PLD functionality of the security block may be updated separated from the PLD die of the multi-chip system that implements user functions, and/or the configuration bitstream for the security block may be stored in multiple places, including on and off chip or system NVM (e.g., NVM of a baseboard security manager coupled to the multi-chip system) and may be accessed over a serial peripheral interface (SPI). Die-to-die interfaces may be used to facilitate communication between the dice of the multi-chip system. In some cases, the multi-chip module system interfaces can provide an external interface that allows the multi-chip module system to be configured and/or used as though the multi-chip module system contained a single PLD die.

While various embodiments are discussed herein with reference to and present improvements in the field of PLD utilization (e.g., including FPGA), various embodiments discussed herein may be implemented in other types of hardware and/or software. By way of non-limiting examples, multi-chip architectures/systems described herein may be implemented using application-specific integrated circuits (ASICs), system on chips, general logic circuits, processors (e.g., configurable processors, digital signal processors), generally any programmable resources of any programmable circuit or device, or any combination thereof. As an example, various embodiments may be used in custom built register transfer level (RTL) logic that can be implemented in a general integrated circuit (IC) and/or as its own type of dedicated block (e.g., as a standalone resource in a programmable fabric). Embodiments of the present design may allow for significant improvements in performance (e.g., timing performance) and space utilization, when implemented in a PLD, in RTL logic for a customized IC, and/or otherwise. As such, embodiments of the present disclosure should not be viewed as generally limited only to PLD-only implementations.

Referring now to the figures, FIG. 1 illustrates a block diagram of a PLD 100 in accordance with an embodiment of the disclosure. In various embodiments, the PLD 100 may be implemented as a standalone device, for example, or may be embedded in a die that contains a system on a chip (SOC), other logic devices, and/or other integrated circuit(s). The PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or programmable logic cells (PLCs). In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EEPROM), block static RAM (SRAM), and/or flash memory), clock-related circuitry 108 (e.g., clock sources, phase-locked loop (PLL) circuits, delay-locked loop (DLL) circuits, and/or feedline interconnects), and/or various routing resources 180 (e.g., interconnect and appropriate switching circuits to provide paths for routing signals throughout the PLD 100, such as for clock signals, data signals, control signals, or others) as appropriate. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate. In another example, the routing resources 180 may be used to route connections between components, such as between I/O nodes of logic blocks 104. In some embodiments, such routing resources may include programmable elements (e.g., nodes where multiple routing resources intersect) that may be used to selectively form a signal path for a particular connection between components of the PLD 100.

It should be understood that the number and placement of the various elements are not limiting and may depend upon the desired application. For example, various elements may not be required for a desired application or design specification (e.g., for the type of programmable device selected). Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Diamond System Planner software available from Lattice Semiconductor Corporation to permit a user to create a desired configuration and generate corresponding configuration data to program the PLD 100. In this regard, in some cases, the system 130 and/or other external/remote system may be used for factory programming or remote programming (e.g., remote updating) of one or more PLDs (e.g., through a network), such as the PLD 100.

The configuration data may alternatively or in addition be stored on the PLD 100 (e.g., stored in a memory located within the PLD 100) and/or a separate/discrete memory of a system including the PLD 100 and the separate/discrete memory (e.g., a system within which the PLD 100 is operating). In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100. In some embodiments, user interface 135 may be adapted to display a netlist, a component placement, a connection routing, hardware description language (HDL) code, and/or other final and/or intermediary representations of a desired circuit design, for example.

Figure 2:
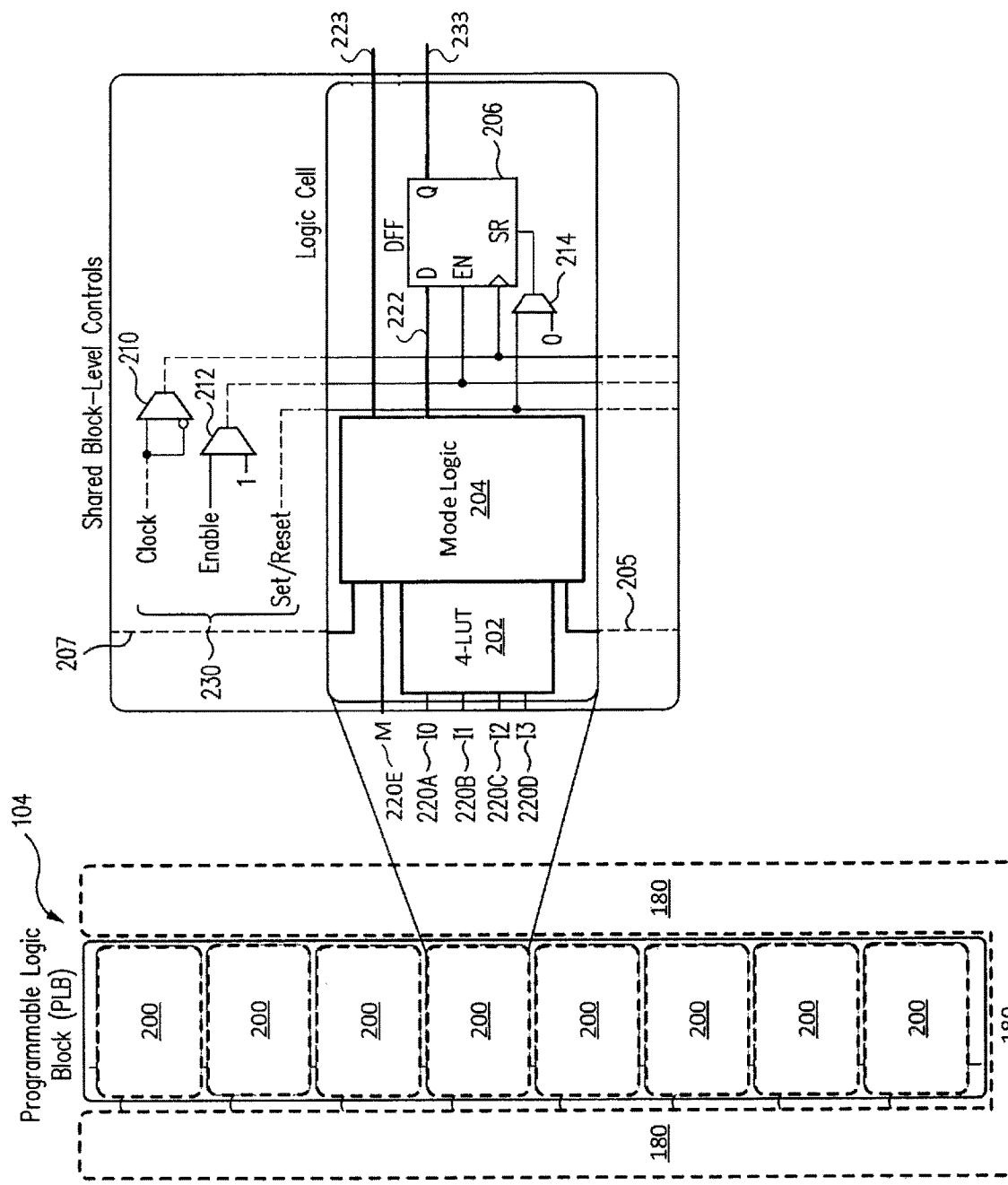
FIG. 2 illustrates a block diagram of a logic block of a PLD in accordance with an embodiment of the disclosure.

FIG. 2 illustrates a block diagram of a logic block 104 of the PLD 100 in accordance with an embodiment of the disclosure. As discussed, the PLD 100 includes a plurality of logic blocks 104 including various components to provide logic and arithmetic functionality. In the example embodiment shown in FIG. 2, the logic block 104 includes a plurality of logic cells 200, which may be interconnected internally within logic block 104 and/or externally using the routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for the logic cell 200 and/or between logic cells 200. In this example, the LUT 202 accepts four inputs 220A-220D, which makes it a four-input LUT (which may be abbreviated as "4-LUT" or "LUT4") that can be programmed by configuration data for the PLD 100 to implement any appropriate logic operation having four inputs or less. The mode logic 204 may include various logic elements and/or additional inputs, such as an input 220E, to support the functionality of various modes for the logic cell 200 (e.g., including various processing and/or functionality modes). The LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from the LUT 202 and/or the mode logic 204 may in some embodiments be passed through the register 206 to provide an output signal 233 of the logic cell 200. In various embodiments, an output signal 223 from the LUT 202 and/or the mode logic 204 may be passed to the output 223 directly, as shown. Depending on the configuration of multiplexers 210-214 and/or the mode logic 204, the output signal 222 may be temporarily stored (e.g., latched) in the register 206 according to control signals 230. In some embodiments, configuration data for the PLD 100 may configure the output 223 and/or 233 of the logic cell 200 to be provided as one or more inputs of another logic cell 200 (e.g., in another logic block or the same logic block) in a staged or cascaded arrangement (e.g., comprising multiple levels) to configure logic and/or other operations that cannot be implemented in a single logic cell 200 (e.g., operations that have too many inputs to be implemented by a single LUT 202). Moreover, logic cells 200 may be implemented with multiple outputs and/or interconnections to facilitate selectable modes of operation.

The mode logic circuit 204 may be utilized for some configurations of the PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, the mode logic circuits 204, across multiple logic cells 202, may be chained together to pass carry-in signals 205 and carry-out signals 207, and/or other signals (e.g., output signals 222) between adjacent logic cells 202. In the example of FIG. 2, the carry-in signal 205 may be passed directly to the mode logic circuit 204, for example, or may be passed to the mode logic circuit 204 by configuring one or more programmable multiplexers. In some cases, the mode logic circuits 204 may be chained across multiple logic blocks 104.

The logic cell 200 illustrated in FIG. 2 is merely an example, and logic cells 200 according to different embodiments may include different combinations and arrangements of PLD components. Also, although FIG. 2 illustrates a logic block 104 having eight logic cells 200, a logic block 104 according to other embodiments may include fewer logic cells 200 or more logic cells 200. Each of the logic cells 200 of a logic block 104 may be used to implement a portion of a user design implemented by the PLD 100. In this regard, the PLD 100 may include many logic blocks 104, each of which may include logic cells 200 and/or other components which are used to collectively implement the user design.

Figure 3:
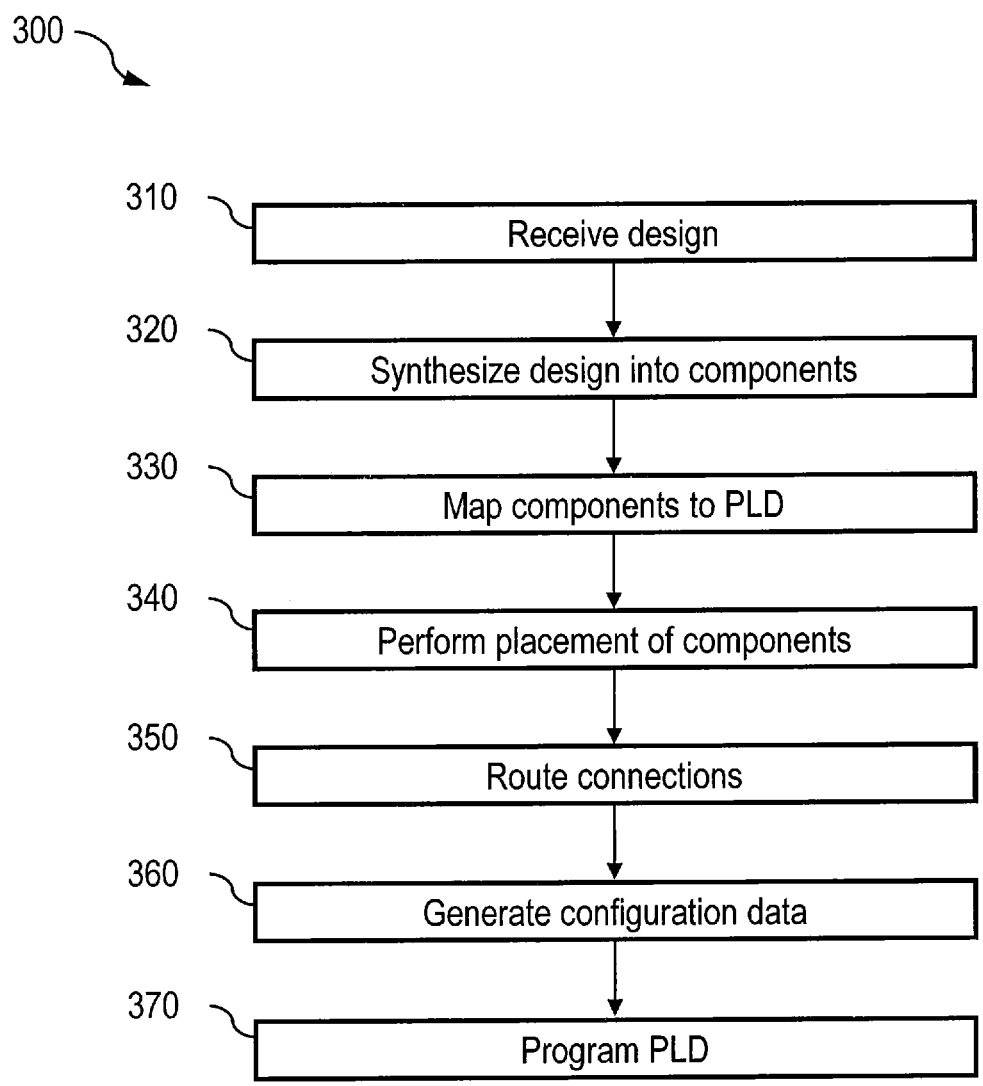
FIG. 3 illustrates a design process for a PLD in accordance with an embodiment of the disclosure.

FIG. 3 illustrates a design process 300 for a PLD in accordance with an embodiment of the disclosure. For example, the process of FIG. 3 may be performed by system 130 running Lattice Diamond software to configure the PLD 100. In some embodiments, the various files and information referenced in FIG. 3 may be stored, for example, in one or more databases and/or other data structures in the memory 134, the machine readable medium 136, and/or other storage.

In operation 310, the system 130 receives a user design that specifies the desired functionality of the PLD 100. For example, the user may interact with the system 130 (e.g., through the user input device 137 and hardware description language (HDL) code representing the design) to identify various features of the user design (e.g., high level logic operations, hardware configurations, I/O and/or SERDES operations, and/or other features). In some embodiments, the user design may be provided in a RTL description (e.g., a gate level description). The system 130 may perform one or more rule checks to confirm that the user design describes a valid configuration of PLD 100. For example, the system

130 may reject invalid configurations and/or request the user to provide new design information as appropriate.

In operation 320, the system 130 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of the PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections. In some cases, wiring distances may be determined based on timing.

In operation 330, the system 130 performs a mapping process that identifies components of the PLD 100 that may be used to implement the user design. In this regard, the system 130 may map the optimized netlist (e.g., stored in operation 320 as a result of the optimization process) to various types of components provided by the PLD 100 (e.g., logic blocks 104, logic cells 200, embedded hardware, and/or other portions of the PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, the system 130 performs a placement process to assign the mapped netlist components to particular physical components residing at specific physical locations of the PLD 100 (e.g., assigned to particular logic cells 200, logic blocks 104, clock-related circuitry 108, routing resources 180, and/or other physical components of PLD 100), and thus determine a layout for the PLD 100. In some embodiments, the placement may be performed in memory on data retrieved from one or more previously-stored NCD files, for example, and/or on one or more previously-stored NCD files, with the placement results stored (e.g., in the memory 134 and/or the machine readable medium 136) as another physical design file.

In operation 350, the system 130 performs a routing process to route connections (e.g., using the routing resources 180) among the components of the PLD 100 based on the placement layout determined in operation 340 to realize the physical interconnections among the placed components. In some embodiments, the routing may be performed in memory on data retrieved from one or more previously-stored NCD files, for example, and/or on one or more previously-stored NCD files, with the routing results stored (e.g., in the memory 134 and/or the machine readable medium 136) as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for the PLD 100 (e.g., by combining the results of the corresponding previous operations). In operation 360, the system 130 generates configuration data for the synthesized, mapped, placed, and routed user design. In various embodiments, such configuration data may be encrypted and/or otherwise secured as part of such generation process. For a multi-chip module system in accordance with embodiments herein, the configuration data may further include factory data indicative of a root of trust of the multi-chip module system. Such configuration data associated with this factory data may be included in the configuration data generated at operation 360 without specific instruction/design from the user. In operation 370, the system 130 configures/programs the PLD 100 with the configuration data (e.g., a configuration) into the PLD 100 over the connection 140. Such configuration may be provided in an encrypted, signed, or unsecured/unauthenticated form dependent on application/requirements.

Figure 4:
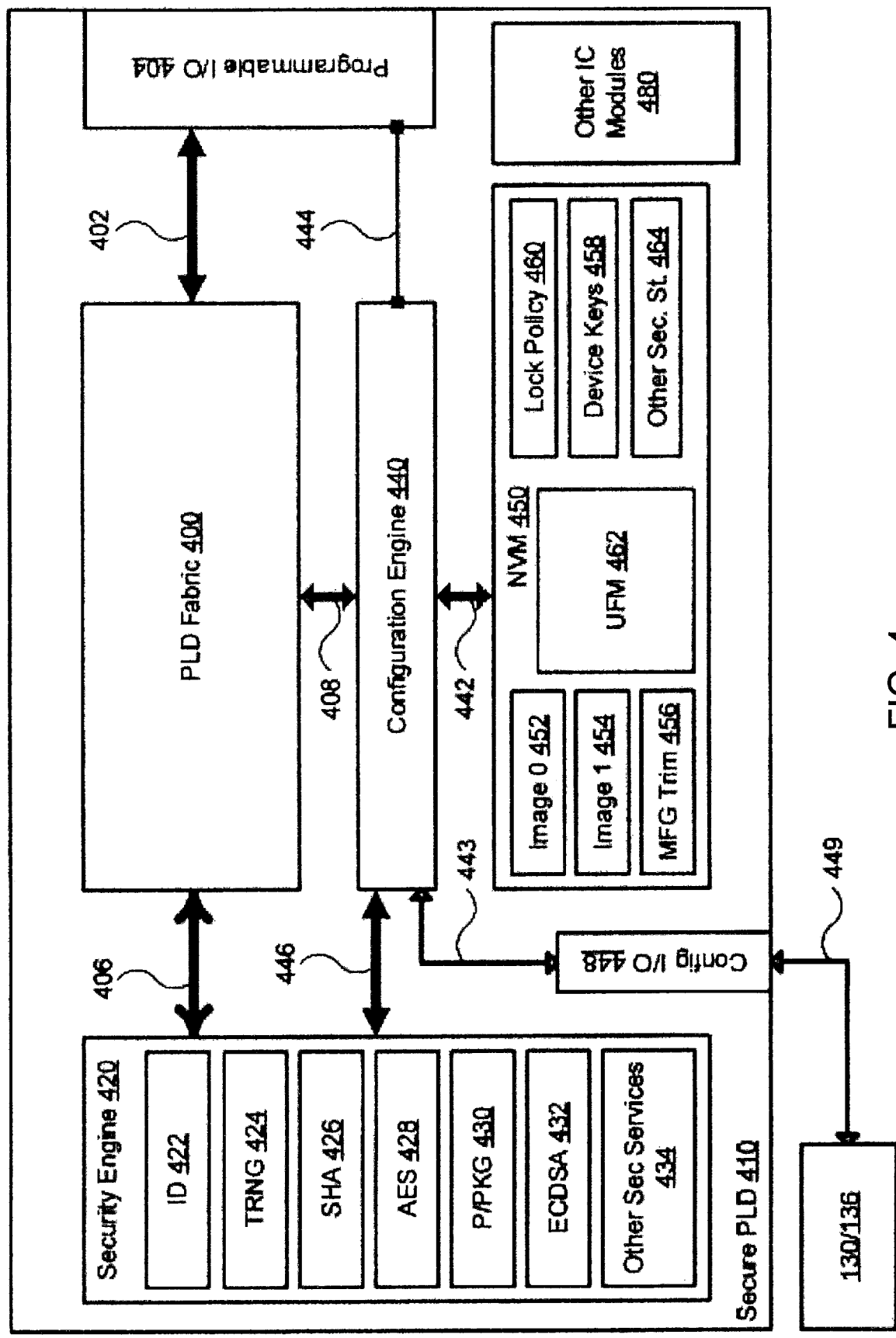
FIG. 4 illustrates a block diagram of a secure PLD in accordance with an embodiment of the disclosure.

FIG. 4 illustrates a block diagram of a secure PLD 410 in accordance with an embodiment of the disclosure. In some embodiments, the secure PLD 410 may be implemented using multi-chips. In some embodiments, a multi-chip system includes a PLD die, such as an IC with an FPGA fabric, and a separate die. The PLD die may implement customer control functions and may contain a root of trust. In some cases, the root of trust may be automatically added by a system builder that produces a configuration bitstream for a user-defined portion of functions implemented in the PLD fabric. The separate die may implement a security block/engine (e.g., embedded security block) to provide security functions. In some cases, the separate die may be a PLD die having a programmable logic functionality, such as an FPGA. Such an FPGA may be a fully functional separate FPGA.

In various embodiments, the secure PLD 410 may be implemented by elements similar to those described with respect to the PLD 100 of FIG. 1, but with additional configurable and/or hard IP elements configured to facilitate operation of the secure PLD 410 in a trusted computing application and/or architecture. In particular, the secure PLD 410 may include a PLD fabric 400 linked by various buses to a security engine 420, a configuration engine 440, an NVM 450, a programmable I/O 404, and/or other IC modules 480. In general, the PLD fabric 400 may be implemented by any of the various elements described with respect to the PLD 100 and may be configured using a design process similar to the process 300 described in relation to FIG. 3 to generate and program the PLD fabric 400 according to a desired configuration. More specifically, the secure PLD 410 may be configured to use various identified hard IP elements identified in FIG. 4 to receive, decrypt, authenticate, and/or verify a received configuration prior to programming the PLD fabric 400 according to the received configuration.

The security engine 420 may be implemented as a hard IP resource configured to provide various security functions for use by the PLD fabric 400 and/or configuration engine 440. In the embodiment shown in FIG. 4, the security engine 420 includes a device ID 422 (e.g., a 64-bit unique and device specific ID), a true random number generator (TRNG) 424, a secure hash algorithm (SHA) service 426 (e.g., an SHA-256/384, SHA-2, and/or SHA-3 service), an advanced encryption standard (AES) service 428 (e.g., an AES 256/128 encrypt/decrypt service), a public/private key pair generator (P/PKG) 430, an elliptic curve digital signature algorithm (ECDSA) authentication service 432 (e.g., an ECDSA256 or ECDSA384 service), and/or other security services 434.

The security engine 420 may be communicatively linked to the PLC fabric 400 over a limited bus 406 and to the configuration engine 440 over a secure bus 446. In general, the limited bus 406 may be configured to allow the PLD fabric 400 to access a limited set of security functions hosted by the security engine 420 and/or to access such security functions in a limited manner, such as disallowing access to a private key of a public/private key pair generated by the P/PKG 430. By contrast, the secure bus 446 may be configured to allow the configuration engine 440 to access and/or modify all security functions, data, and/or configurations of the security engine 420. In general, either or both the limited bus 406 and secure bus 446 may be configured to provide encrypted and/or otherwise secured communication between the security engine 420 and other elements of the secure PLD 410.

The configuration engine 440 may be implemented as a hard IP resource configured to manage the configurations of and/or communications amongst the various elements of the secure PLD 410. For example, the configuration engine 440 may be configured to receive an encrypted/secured configuration of the PLD fabric 400 from the external system 130/machine readable medium 136 over a configuration I/O 448, use security functions of the security engine 420 to authenticate and/or decrypt such configuration, store the authenticated and/or decrypted configuration in the NVM 450, soft or hard lock the portions of the NVM 450 corresponding to the stored configuration, tag the stored configuration as authenticated and/or verified bootable, and/or program the PLD fabric 400 according to the authenticated, decrypted, verified, and/or locked configuration, as described herein. In further embodiments, the configuration engine 440 may be configured to configure at least a portion of the programmable I/O 404 (e.g., to enable and/or disable at least portions of the programmable I/O 404) over the configuration port 444, as shown.

More generally, the configuration engine 440 may be configured to manage or control configurations of elements of the secure PLD 410, lock statuses of elements of the secure PLD 410, boot of the PLD fabric 400, and flow control throughout the secure PLD 410. For example, the configuration engine 440 may be configured to soft lock or unlock or hard lock any one or portion of buses 408, 442, 443, 446, for example, and/or to soft lock or unlock or hard lock any portion of sector of NVM 450. In a default unlocked configuration, buses 408, 442, and 446 may be implemented as secure buses similar in function to the secure bus 446. An external access bus 443 to the configuration I/O 448 may be implemented according to one or more of a JTAG, I2C, SRI, and/or other external access bus or protocol, for example, configured to provide lockable/unlockable access to and/or from the external system 130/machine readable medium 136. In a particular embodiment, the secure bus 408 may be implemented according to a wishbone bus/interface.

The NVM 450 may be implemented as a hard IP resource configured to provide securable non-volatile storage of data used to facilitate secure operation of the secure PLD 410. For example, the NVM 450 may include a lock policy 460 corresponding to memory locations in the NVM 450 indicating a lock status of data stored in the NVM 450. The contents of the lock policy 460 may be transferred to shadow registers within the configuration engine 440 upon power on of the secure PLD 410, for example, to allow such contents to be modified dynamically by the configuration engine 440 and/or the PLD fabric 400, depending on settings/lock statuses in the lock policy 460. In general, the lock status of a particular resource indicates read, write/program, and/or erase access for that resource, as against the PLD fabric 400, configuration I/O 448/external access bus 443, and/or other elements of the secure PLD 410.

As described herein, "soft" lock refers to a read, write, and/or erase access status of a bus/port or memory location in the NVM 450 that can be programmatically enabled or disabled by the PLD fabric 400 and/or across an external access bus 443 to granularly allow or disallow read, write, and/or erase access to the corresponding resource. "Hard" lock refers to a read, write, and/or erase access status of a bus/port or memory location in the NVM 450 that can be programmatically enabled across the external access bus 443, but that cannot be enabled or disabled by the PLD fabric 400 and that cannot be disabled across the external access bus 443. In various embodiments, assertion of a hard lock is generally one-way and eliminates the ability of the PLD fabric 400 and/or external access bus 443 to further modify the lock status of all secured resources within the secure PLD 410. In some embodiments, such locking scheme may be implemented by four bits for each resource (e.g., bus/port or sector of memory within the NVM 450), one bit each for hard lock enable, read lock enable, write lock enable, and erase lock enable.

As shown in the embodiment illustrated by FIG. 4, the NVM 450 may include multiple differentiated lockable sectors, each of which may have its own lock status. Such lockable sectors may include, for example, one or more of a first configuration image sector 452, a second configuration image sector 454, a manufacturer-specified trim sector 456, a device key sector 458 (e.g., an AES key sector and a separate public key/key pair sector), a lock policy selector 460, a user flash memory (UFM) sector 462, and/or other defined securable storage sectors 464, as shown. In some embodiments, the UFM sector 462 may be further differentiated into subsectors each of which may have its own lock status. The lock policy sector 460 may store the lock status of each sector of the NVM 450, for example, including its own lock status. First and second configuration image sectors 452-454 may each store a configuration for the PLD fabric 400, for example, and may further be tagged by version and/or date and as pre-authenticated so as to allow them to be selected (e.g., based on version or date) and used to program the PLD fabric without performing an authentication process. The trim sector 456 may be used to store manufacture trim and/or other data specific to a particular secure PLD 410, for example, such as a modifiable customer-specific ordering part number derived from the device ID 422 and a general customer ID number, as described herein. The device key sectors 458 may be used to store encryption/decryption keys, and/or other security keys specific to a particular secure PLD 410. The lock policy sector 460 may be configured to store lock statuses for resources of the NVM 450, the configuration engine 440, the configuration I/O 448, and/or other elements of the secure PLD 410. The UFM sector 462 may be used to store user data generally accessible by the PLD fabric 400, such as configurations or application-specific security keys, certificates, and/or other secure(d) user data. Any one or more individual elements, portions, or sectors of the NVM 450 may be implemented as configurable memory, for example, or one time programmable (OTP) memory.

The programmable I/O 404 may be implemented as at least partially configurable resources configured to provide or support a communication link between the PLD fabric 400 and an external controller, memory, and/or other device, for example, across a bus 402 (e.g., a bus configured to link portions of the PLD fabric 400 to the programmable I/O 404). In some embodiments, the bus 402 and/or the programmable I/O 404 may be integrated with the PLD fabric 400. The configuration I/O 448 may be implemented as hard IP resources configured to support one or more external bus interfaces and/or protocols 449 to support communications with the external system 130/machine readable medium 136, as described herein. In some embodiments, the configuration I/O 448 and/or the bus 443 may be integrated with the configuration engine 440. More generally, the configuration I/O 448 and/or the bus 443 may be integrated with the configuration engine 440. More generally, one or more elements of the secure PLD 410 shown as separate in FIG. 4 may be integrated with and/or within each other. Other IC modules 480 may be implemented as hard and/or configurable IP resources configured to facilitate operation of the secure PLD 410.

Figure 5A:
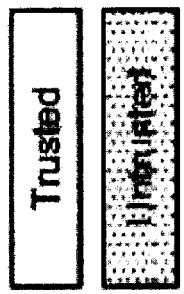
FIG. 5A illustrates a block diagram of a secure PLD provisioning system in accordance with an embodiment of the disclosure.
Figure 5A:
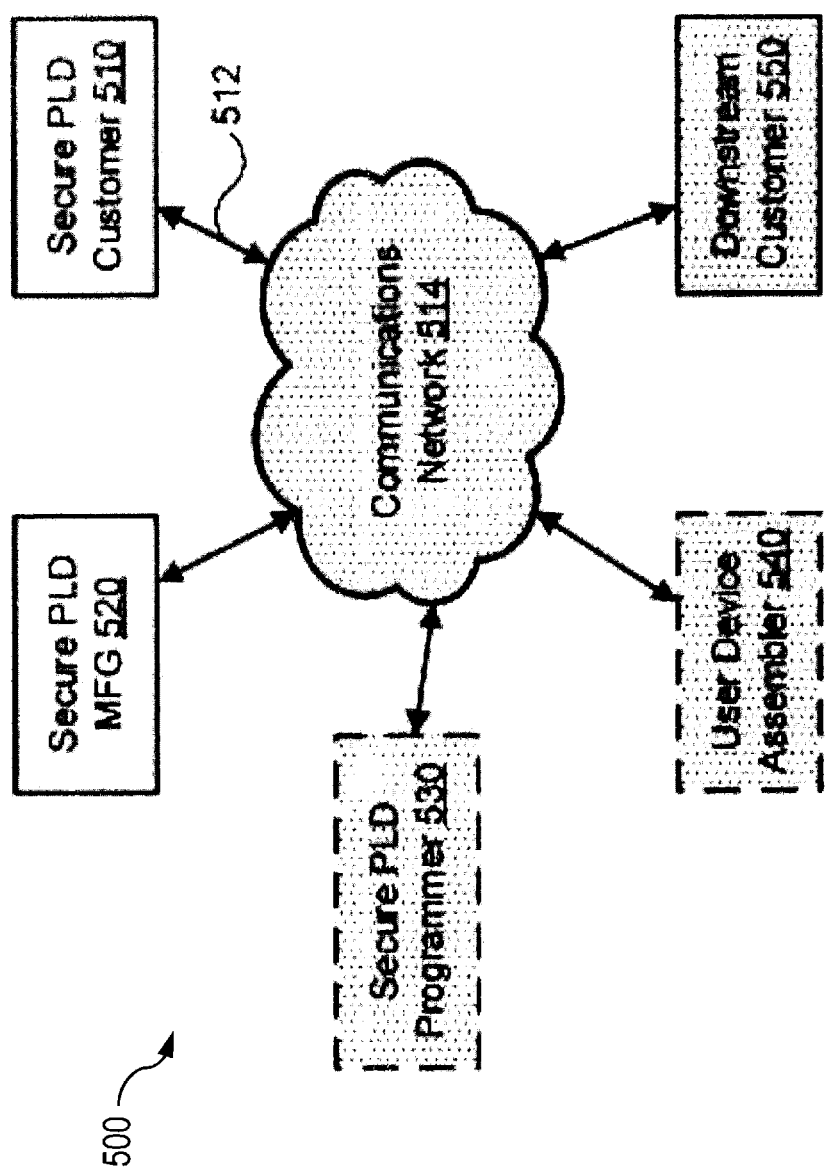

FIG. 5A illustrates a block diagram of a secure PLD provisioning system 500 in accordance with an embodiment of the disclosure. For example, one or more elements of the provisioning system 500 may be configured to perform at least portions of the provisioning process described in relation to FIG. 7. In the embodiment shown in FIG. 5A, the secure PLD provisioning system 500 includes a secure PLD customer 510 and secure PLD manufacturer 520 configured to communicate with each other over communication links 512 and communications network 514. In general, the communication links 512 may be implemented by one or more wired and/or wireless communication links configured to support data communications to and from the communications network 514, and the communications network 514 may be implemented by one or more local and/or wide area networks configured to support data communications generally (e.g., internet service providers, cellular networks, and/or the Internet). Each of the remaining elements of the secure PLD provisioning system 500 represent entities in the manufacturing and delivery chain for the secure PLD 410, for example, and may generally be implemented by network communication devices each similar in scope to the external system 130 of FIG. 1 and configured to communication across the communication links 512 and communications network 514. In various embodiments, the secure PLD provisioning system 500 may be configured to provision keys and/or other secure communication elements and/or mechanisms for secure PLDs similar to the secure PLD 410.

As shown in FIG. 5A, the secure PLD customer 510 and secure PLD manufacturer 520 may be considered trusted entities within the provisioning system 500, and all other elements of the provisioning system 500 may be considered untrusted entities, such that customer and/or manufacturer software and/or hardware should generally be protected or otherwise secured against unwanted access or manipulation by a downstream customer 550 and/or optional secure PLD programmer 530 and user device assembler 540. For example, in general operation, the secure PLD customer 510 requests one or more secure PLDs 410 from the secure PLD manufacturer 520 and generates a proprietary configuration to be programmed into the PLD fabric 400 of the secure PLD 410. The secure PLD manufacturer 520 prepares the one or more requested secure PLDs 410 by fabricating the individual ICs and programming them with security mechanisms (e.g., locking them) to bar further programming by configurations not supplied by the secure PLD customer 510 and/or secure PLD manufacturer 520. The secure PLD customer 510 may provide device-specific encrypted configurations to the optional secure PLD programmer 520, and the secure PLD manufacturer 520 may provide the locked secure PLDs 410 to the secure PLD programmer 530, such that the secure PLD programmer 530 can only program each locked secure PLD 410 with its device-specific encrypted configuration, and such that the secure PLD programmer 530 cannot easily determine the unencrypted contents of the device-specific encrypted configuration.

The secure PLD programmer 530 may deliver the programmed and locked secure PLDs 410 to the optional user device assembler 540 (e.g., a motherboard assembler, a smart phone assembler, and/or other user device/embedded device assembler/manufacturer), which integrates the programmed and locked secure PLDs 410 with the user device and provides the integrated user device to the downstream customer 550, all without the secure PLD programmer 530 and downstream customer 550 being able to determine the unencrypted contents of the device-specific encrypted configurations or to reprogram the locked secure PLDs with alternative configurations. The secure PLD customer 510 may then audit the programmed and locked secure PLDs 410 in the corresponding user devices at the downstream customer 550 without divulging the unencrypted contents of the device-specific encrypted configurations or unlocking the secure PLDs 410. Although shown in FIG. 5A as separate entities, the secure PLD programmer 530 and user device assembler 540 may be combined together and/or individually integrated with the secure PLD customer 510, secure PLD manufacturer 520, and/or downstream customer 550.

Figure 5B:
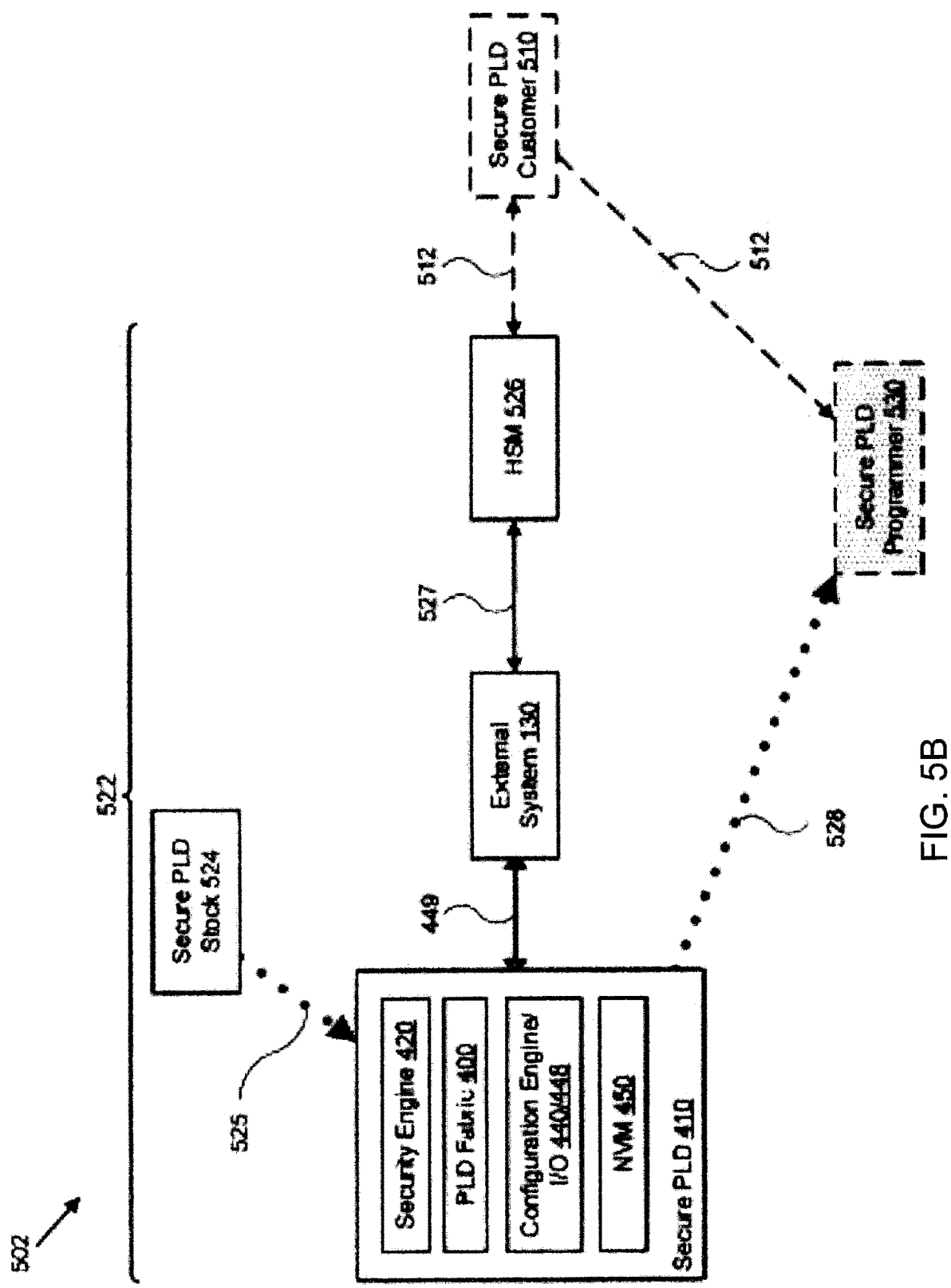
FIG. 5B illustrates a block diagram of a secure PLD provisioning system in accordance with an embodiment of the disclosure.

FIG. 5B illustrates a block diagram of a secure PLD provisioning system 502 in accordance with an embodiment of the disclosure. For example, one or more elements of the provisioning system 502 may be configured to perform at least portions of the provisioning process described in relation to FIG. 7. In one embodiment, the secure PLD provisioning system 502 may roughly correspond to the secure PLD manufacturer 520 in FIG. 5A. More generally, a system similar to or including elements of the secure PLD provisioning system 502 may be used to implement any one or multiple elements of the secure PLD provisioning system 500 shown in FIG. 5A.

In the embodiment shown in FIG. 5B, the secure PLD provisioning system 502 includes a secure PLD locking system 522 configured to lock and/or retarget a number of secure PLDs 410 sourced from the secure PLD stock 524 (e.g., unlocked/blank secure PLDs 410 and/or previously locked secure PLDs 410 slated for retargeting to a different secure PLD customer or request) according to a request issued by the secure PLD customer 510. Once locked by the secure PLD locking system 522, locked secure PLDs may generally only be programmed with a configuration provided by the secure PLD customer, such as by the locking system 522 or, more generally, by the secure PLD programmer 530. In various embodiments, the secure PLD locking system 522 may include a hardened security module (HSM) 526 configured to receive a customer public key from the secure PLD customer 510 over the unsecured communication link 512, for example, and control the external system 130 via a secure communication link 527 to lock the secure PLD 410 provided over a device delivery link 525 (e.g., a mechanical and/or electronic delivery link configured to retrieve the secure PLD 410 with the external system 130 via the external bus interface 449). Locked secure PLDs 410 may then be physically delivered to the secure PLD programmer 530 over a similar device delivery link 528. The HSM 526 may generally be implemented similarly to the external system 130, for example, but placed in a secure factory location with monitored and limited physical access to eliminate risk of external manipulation and/or monitoring of the HSM 526. In some embodiments, the external system 130 and HSM 526 and/or their functionality may be integrated into a single external system 130.

In general operation, the secure PLD customer 510 may provide a request for a number of locked secure PLDs 410 to the HSM 526 that includes a customer public key of a customer public/private key pair (e.g., generated within the secure PLD customer 510, such as by its own HSM). The HSM 526 may generate a customer-specific programming public/private key pair (e.g., used to encrypt, decrypt, and/or authenticate configurations for locked secure PLDs 410, such as to lock the secure PLD 410 and unlock the secure PLD 410 for programming) and may generate a programming secret (e.g., a 256-bit random number word to further authenticate provided configurations) and provide the programming private key, and a factory public key and/or the programming secret to the external system 130 for loading into and locking a blank or unlocked secure PLD 410. The HSM 526 may be configured to generate the factory public/private key pair locally and/or retrieve such factory keys from the memory 134, for example, and such factory keys may be factory-specific and/or customer-specific. The configuration engine 440 may receive a device-specific trace ID (e.g., which may identify a manufacturing batch, wafer, and wafer location corresponding to a fabrication process for the secure PLD 410), the programming private key, the programming secret, the factory public key, and an initial programming image (IPI) configuration for the PLD fabric 400, which may all be stored in one or more sectors of the NVM 450 to lock the secure PLD 410.

The configuration engine 440 may then store the trace ID in the MFG trim 456 of the NVM 450 and/or within the device ID 422 of the security engine 420 and generate a device unique seed by appending a random number (e.g., generated by the TRNG 424) to the end of the trace ID, and such device unique seed may be stored within the MFG trim 456 and/or used to seed generation of a device public/private key pair (e.g., generated by the P/PKG 430 of the security engine 420), which may be stored within the device keys sector 458 of the NVM 450. The configuration engine 440 may then provide the resulting device public key and trace ID to the external system 130, which may relay the device public key and trace ID to the HSM 526 to be added to a locked PLD manifest including a line item for each locked secure PLD 410 requested by the secure PLD customer 510, where each line item includes the device-specific trace ID and device public key. The HSM 526 may then encrypt and sign the programming secret using the customer public key and the programming private key, and the resulting encrypted programming packet may be provided to the secure PLD customer 510 and accompanied by the programming public key (e.g., to help generate an encrypted and signed configuration for the PLD fabric 400 of the secure PLD 410). Once completed with entries for all locked PLD manifest to the secure PLD customer 510, which can then use the locked PLD manifest, the programming secret, and the programming public key to manage programming of locked secure PLDs 410 by the secure PLD programmer 530.

In some embodiments, the HSM 526 may be configured to generate a customer programming key token corresponding to a particular secure PLD customer 510 and/or the particular request for locked secure PLDs 410 received from the secure PLD customer 510. Such customer programming key token may be used to reference (e.g., within a customer database stored in the HSM 426) all information stored with respect to the secure PLD customer 510 and/or the request for locked secure PLDs 410 received from the secure PLD customer 510. Such stored information may include the programming public/private key pair, the programming secret, the factory public/private key pair, the locked PLD manifest, and/or other information or subsets of information associated with operation of the secure PLD provisioning system 502 and/or 500. In embodiments where the PLD stock 524 includes one or more previously locked secure PLDs 410 slated for retargeting (e.g., locking to a different secure PLD customer or different secure PLD request), the HSM 526 may be configured to use a prior customer programming key token to retrieve the information used to lock the locked secure PLD, provide new information to the secure PLD 410 (e.g., through the external system 130) that is signed using the previous factory private key, and provide a retargeting command to the secure PLD 410 (e.g., to be executed by the secure PLD 410), where the retargeting command is executed by the PLD fabric 400 and/or configuration engine 440 to authenticate the new information with the previous factory public key stored in the NVM 450 and replace the previous information stored in the NVM 450 (e.g., the device public/private key pair, the programming private key, the programming secret, the factory public key, and/or the IPI) with corresponding new or updated information.

Figure 6:
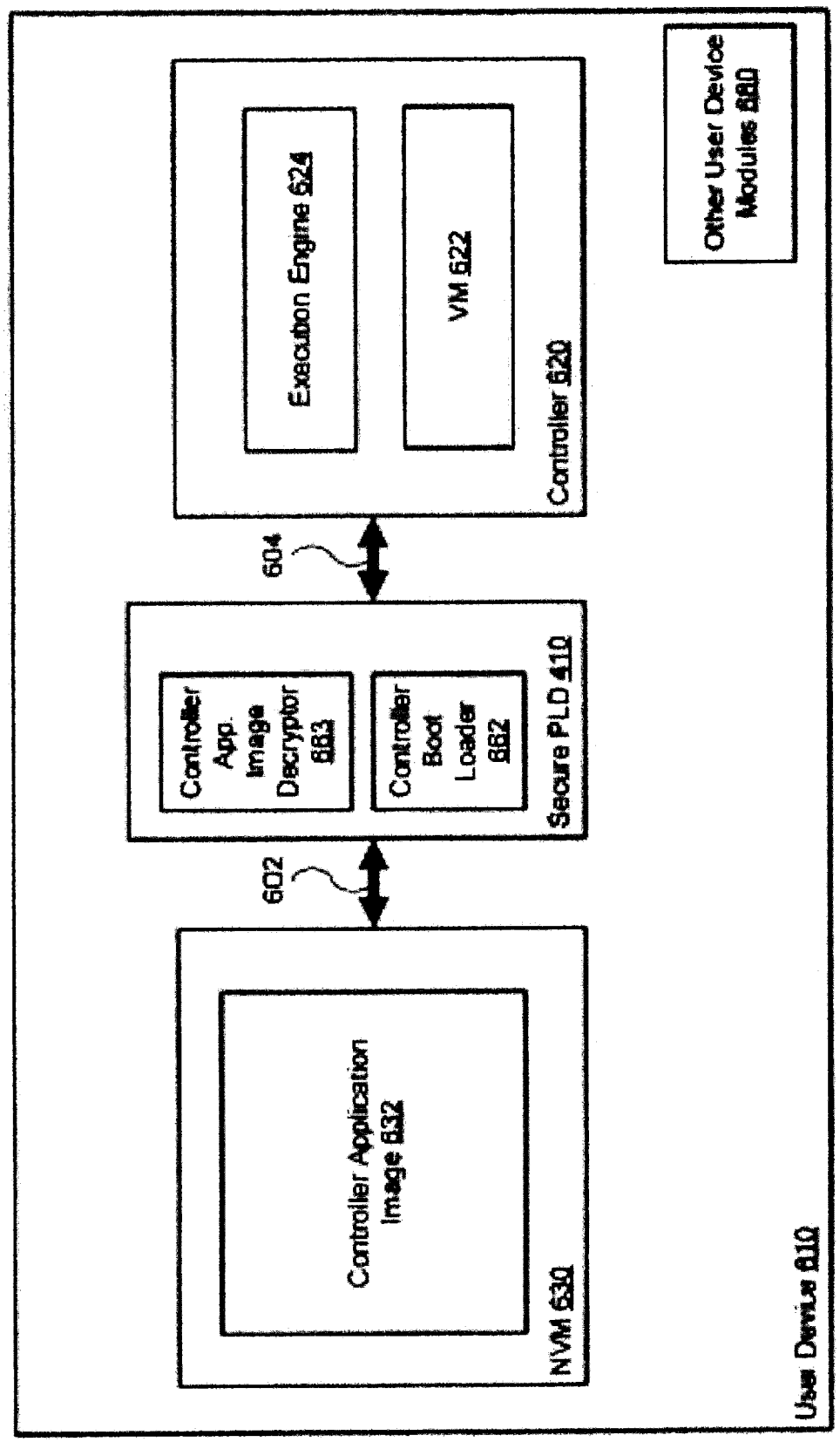
FIG. 6 illustrates a block diagram of a user device including the secure PLD of FIG. 4 in accordance with an embodiment of the disclosure.

FIG. 6 illustrates a block diagram of a user device 610 including the secure PLD 410 in accordance with an embodiment of the disclosure. In one embodiment, the secure PLD 410 may be configured to provide a secure boot mechanism for the user device 610 (e.g., a motherboard, a smart phone, and/or other user/embedded devices). For example, at power on of the user device 610, the secure PLD 410 may be configured to use the P/PKG 430 of the security engine 420 to generate a temporary public/private key pair and to provide the temporary public key and a controller bootloader 662 (e.g., which may be pre-authenticated and/or stored in the UFM 462 of the NVM 450)) to a controller 620 over a bus 604 (e.g., a bus supported by the programmable I/O 404). An execution engine 624 of the controller 620 may be configured to execute the controller bootloader 662 upon receiving it from the secure PLD 410, which may configure the execution engine 624 to generate a temporary session key (e.g., using power-on RAM values derived from a power-on state of a volatile memory (VM) 612), to encrypt the temporary session key using the temporary public key provided by the secure PLD 410 and a cryptographic salt, and to provide the resulting first encrypted package to the secure PLD 410 over the bus 604.

The secure PLD 410 may be configured to extract the temporary session key from the first encrypted package provided by the controller 620 (e.g., using the temporary private key), to encrypt a controller application image decryptor 663 using the session key, and provide the resulting second encrypted package to the controller 620 over the bus 604. The execution engine 624 of the controller 620 may be configured to extract the controller application image decryptor 663 from the second encrypted package upon receiving it from the secure PLD 410, which may configure the execution engine 624 to retrieve, authenticate, and decrypt a controller application image 632 stored in an NVM 630 (e.g., over the buses 602 and 604), store the authenticated and decrypted controller application image 632 in the VM 622, and execute the authenticated and decrypted controller application image 632. In addition, the secure PLD 410 and controller 620 may be configured to register a secure communication path with each other.

In another embodiment, the secure PLD 410 may be configured to verify a configuration used to program the PLD fabric 400 of the secure PLD 410, using the controller 620. For example, the secure PLD 410 may be configured to use the P/PKG 430 of the security engine 420 to generate a temporary public/private key pair and provide the temporary public key to the controller 620. The execution engine 624 of the controller 620 may be configured to generate a temporary session key, encrypt the temporary session key using the temporary public key provided by the secure PLD 410 and a cryptographic salt, and to provide the resulting third encrypted package to the secure PLD 410 over the bus 604. The controller 620 may also be configured to use the session key to encrypt a request to extract identifying data from one or more configuration images stored in the NVM 450 of the secure PLD 410, for example, and to send the resulting fourth encrypted package to the secure PLD 410 over the bus 604.

The secure PLD 410 may be configured to extract the temporary session key from the third encrypted package provided by the controller 620, use the temporary session key to extract the request from the fourth encrypted package, to extract the requested identifying data from the one or more configuration images stored in the NVM 450 of the secure PLD 410, to encrypt the requested identifying data using the temporary session key, and to provide the resulting fifth encrypted package to the controller 620 over the bus 604. Upon receipt, the controller 620 may be configured to verify a version, release data, and/or other characteristics of the one or more configuration images stored in the NVM 450 by comparison to a database of such characteristics residing in the user device 610 (e.g., in the NVM 630 or VM 622) and/or accessible over or retrieved from a network (e.g., communications network 514, accessed via other user device modules 680, which may include a network interface device). In further alternative embodiments, the secure PLD 410 may take the place of the controller 620 and be used to control operation of the user device 600.

Figure 7:
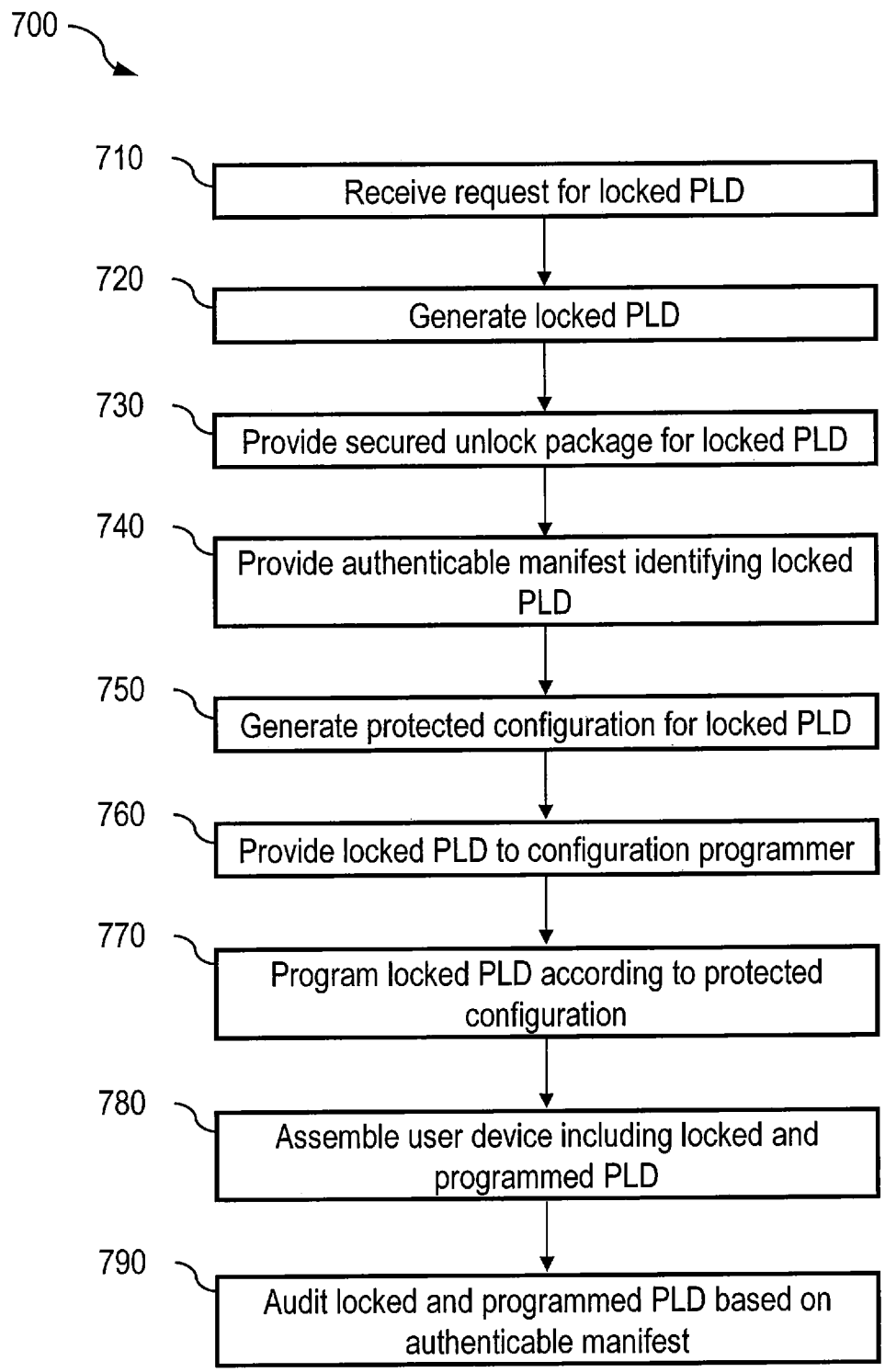
FIG. 7 illustrates a provisioning process for a locked secure PLD in accordance with an embodiment of the disclosure.

FIG. 7 illustrates a provisioning process for a locked secure PLD in accordance with an embodiment of the disclosure. In some embodiments, the operations of FIG. 7 may be implemented as software instructions executed by one or more logic devices associated with corresponding electronic devices, modules, and/or structures depicted in FIGS. 1-6. More generally, the operations of FIG. 7 may be implemented with any combination of software instructions and/or electronic hardware (e.g., inductors, capacitors, amplifiers, actuators, or other analog and/or digital components). It should be appreciated that any step, sub-step, sub-process, or block of the process 700 may be performed in an order or arrangement different from the embodiments illustrated by FIG. 7. For example, in other embodiments, one or more blocks may be omitted from the process 700, and other blocks may be included. Furthermore, block inputs, block outputs, various sensor signals, sensor information, calibration parameters, and/or other operational parameters may be stored to one or more memories prior to moving to a following portion of the process 700. Although the process 700 is described with reference to systems, devices, and elements of FIGS. 1-7, the process 700 may be performed by other systems, devices, and elements, and including a different selection of electronic systems, devices, elements, assemblies, and/or arrangements. At the initiation of the process 700, various system parameters may be populated by prior execution of a process similar to the process 700, for example, or may be initialized to zero and/or one or more values corresponding to typical, stored, and/or learned values derived from past operation of the process 700, as described herein.

At block 710, a logic device receives a request for a locked PLD. For example, a network communications device (e.g., external system 130, HSM 526) of the secure PLD manufacturer 520 may be configured to receive a request for a locked secure PLD 410 from a network communications device (e.g., external system 130, HSM 426) of the secure PLD customer 510. Such request may be transmitted over the communication links 512 and/or through the communications network 514, for example, and may include a customer public key of a corresponding customer public/private key pair, along with the number of devices requested and any specific model or other identifying information associated with a particular desired secure PLD 410.

At block 720, a logic device generates a locked PLD. For example, the secure PLD manufacturer 520 may be configured to generate a locked secure PLD 410. In some embodiments, the secure PLD manufacturer 520 may use an IC fabrication system to fabricate the secure PLD 410, for example, which may include programming or storing or otherwise embedding the device ID 422 in the security engine 420 and/or MFG trim 456 of the NVM 450. The secure PLD manufacturer 520 may also use the external system 130 to lock the secure PLD 410. In one embodiment, the secure PLD locking system 522 of the secure PLD manufacturer 520 may be configured to assign a customer ID to the secure PLD customer 510 and/or the request received at block 710, which may then be combined with the device 422 and/or a device ordering part number (e.g., generated at manufacture) to provide a customer specific ordering part number that may be used to reference or identify the secure PLD 410, such as in an unencrypted database stored in the HSM 526.

The HSM 526 may also be configured to generate a customer programming key token corresponding to the secure PLD customer 510 and/or the customer public key in the request received at block 710 by generating a corresponding random and unique customer programming key token and/or a customer specific ordering part number and referencing all stored information related to generating locked secure PLDs referenced to such token or number. The HSM 526 may also be configured to generate a programming public/private key pair and a programming secret, all specific to the secure PLD customer 510 and/or the request received at block 710, all of which may be stored in the HSM 526. The HSM 526 may additionally be configured to generate a factory public/private key pair, which may be specific to the secure PLD manufacturer 520, secure PLD customer 510, and/or the request received at block 710, which may also be stored in the HSM 526.

The HSM 526 may be configured to provide the factory public key, the programming private key, and the programming secret to the external system 130 for programming/locking of the secure PLD 410, for example, and to receive device-specific trace IDs and device public keys in return. The HSM 526 may also be configured to encrypt and sign the programming secret using the customer public key and the programming private key, and the resulting encrypted programming packet may be provided to the secure PLD customer 510 and accompanied by the programming public key (e.g., to help the secure PLD customer 510 to generate an encrypted and signed configuration for the PLD fabric 400 of the secure PLD 410). The secure PLD 410 may be configured to use the TRNG 424 of the security engine 420 to generate a device unique seed based on the trace ID stored in the MFG trim 456 and/or device ID 422, and to use the device unique seed and/or P/PKG 430 of the security engine 420 to generate a device public/private key pair, all specific to the secure PLD 410, and all of which may be stored in the NVM 450 (e.g., along with the programming private key, programming secret, factory public key, and/or an IPI configuration provided by the external system 130 and/or HSM 526).

In another embodiment, the HSM 526 may be configured to use the customer programming key token to retrieve the programming private key, the programming secret, and the device public key from a securely stored database and provide them to the external system 130. The external system 130 may then be configured to use the programming private key, the programming secret, and/or the device public key to provide an IPI configuration to the secure PLD 410 and program the PLD fabric 400 with the IPI. This programming may constitute an unsecure write operation and so may require a secure environment (e.g., taking place entirely within the secure PLD manufacturer 520). In further embodiments, the HSM 526 may be configured to receive a locked PLD manifest entry from the external system 130 including a trace ID corresponding to the secure PLD 410 and a corresponding device public key, to generate a complete locked PLD manifest corresponding to the request received at block 710, to sign the locked PLD manifest with the programming private key, and to provide the signed locked PLD manifest to the secure PLD customer 510.

In additional embodiments, it may be useful to retarget an already programmed and locked secure PLD to a different customer or application (e.g., with a different programming key pair, programming secret, and public device key). Typically, an already programmed IPI need not be reprogrammed (e.g., the same IPI configuration for PLD fabric 400 may be used). For example, the HSM 526 may be configured to use a customer programming key token and/or a trace ID to retrieve prior information (e.g., the original programming private key, programming secret, and device public key stored in the HSM 526) used to lock the secure PLD 410. The HSM 526 may then be configured to use the external system 130 to provide new information to the secure PLD 410 that is signed using the previous factory private key, and provide a retargeting command to the secure PLD 410 (e.g., to be executed by the secure PLD 410), where the retargeting command may be executed by PLD fabric 400 and/or configuration engine 440 to authenticate the new information with the previous factory public key stored in the NVM 450 and replace the previous information stored in the NVM 450 (e.g., the device public/private key pair, the programming private key, the programming secret, the factory public key, and/or the IPI) with corresponding new or updated or retargeted information.

At block 730, a logic device provides a secured unlock package for a locked PLD. For example, the HSM 526 of the secure PLD manufacturer 520 may be configured to provide a secured unlock package for the locked secure PLD 410 generated at block 720 to the secure PLD customer 510. In one embodiment, the HSM 526 may be configured to provide the encrypted programming packet, the programming public key, and/or the customer programming key token generated at block 720 to the secure PLD customer 510. Such information may be used by the secure PLD customer 510 to generate a protected configuration for the secured PLD 410, as locked in block 720.

At block 740, a logic device provides an authenticatable manifest identifying a locked PLD. For example, the secure PLD manufacturer 520 may be configured to provide an authenticatable locked PLD manifest identifying the locked secure PLD 410 generated at block 720. In one embodiment, the HSM 526 may be configured to generate a manifest of trace IDs and device public keys (e.g., a manifest of device public keys referenced by trace ID), to sign the locked PLD manifest using the programming private key generated at block 720, and to provide the signed locked PLD manifest to the secure PLD customer 510. Such information may be used by the secure PLD customer 510 to audit a selection of deployed and/or locked secured PLDs 410.

At block 750, a logic device generates a protected configuration for a locked PLD. For example, the external system 130 of the secure PLD customer 510 may be configured to generate a protected configuration for the locked secure PLD 410 generated at block 720. In one embodiment, the external system 130 may be configured to generate an unprotected configuration for the PLD fabric 400 of the secure PLD 410 using a process similar to the process 300 discussed with reference to FIG. 3. Such configuration may include an application bitstream/configuration to be primarily loaded into and configure the PLD fabric 400, for example, and a feature bitstream/configuration to be primarily loaded into and configure the lock policy sector 460, UFM sector 462, and/or other defined securable storage sectors 464. Such feature bitstream/configuration may include security keys, functions, and/or other features that may be executed and/or otherwise used by the configuration engine 440 to implement any of the processes described herein.

In various embodiments, the external system 130 and/or the HSM 526 of the secure PLD customer 510 may be configured to generate an application public/private key pair, an application encryption key (e.g., an AES encryption key), and a programming packet public/private key pair. The external system 130 may be configured to sign the application and feature configurations using the application private key and to encrypt the signed application and feature configurations using the application encryption key. The external system 130 may also be configured to generate a programming key digest by signing a combination/list of the application public key, the application encryption key, and the programming secret (e.g., extracted from the encrypted programming packet of the secured unlock package provided at block 730) with the application private key, deriving an encryption key based on the programming public key and the programming packet private key (e.g., using an elliptic curve Diffie-Hellman service (ECDH) key derivation function), encrypting the signed combination of keys using the derived encryption key, and combining the encrypted and signed combination of keys with the programming packet public key (e.g., appending the programming packet public key to the encrypted and signed combination of keys) to create the programming key digest. The external system 130 may also be configured to sign a locked PLD manifest (e.g., received at block 740) with the packet private key for authenticated delivery to the downstream secure PLD programmer 530, user device assembler 540, and/or downstream customer 550. The external system 130 may be configured to generate a protected configuration for the secure PLD 410 by combining the encrypted application and feature configurations with the programming key digest to create a single protected packet of information.

At block 760, a logic device provides a locked PLD to a configuration programmer. For example, the secure PLD manufacturer 520 may be configured to provide the locked secure PLD 410 generated at block 720 to the secure PLD programmer 530.

At block 770, a logic device programs a locked PLD according to a protected configuration. For example, the external system 130 of the secure PLD programmer 530 may be configured to program the locked secure PLD 410 generated at block 720 according to the protected configuration generated at block 750 and provided by the secure PLD customer 510. In one embodiment, the external system 130 of the secure PLD programmer 530 may be configured to provide the protected configuration/packet generated at block 750 to the secure PLD 410, which may be configured to boot according to the IPI provided to the secure PLD 410 at block 720. The secure PLD 410 may then validate the protected configuration and program elements of the secure PLD 410, including the PLD fabric 400 and portions of the NVM 450, through one or more buses of the secure PLD 410. More particularly, the secure PLD 410 may be configured to decrypt the encrypted keys in the programming key digest using the programming private key stored in the NVM 450 at block 720 and the packet public key generated at block 750. The secure PLD 410 may also be configured to authenticate the decrypted key digest with the application public key and verify that the programming secret in the programming key digest matches the programming secret stored in the NVM 450 at block 720. If both checks pass, the secure PLD 410 may store the application public key and application encryption key from the key digest in the NVM 450.

Once the application public key and application encryption key from the key digest are stored in the NVM 450, the secure PLD 410 may then decrypt the application and feature configurations and authenticate the decrypted application and feature configurations. For example, the application and feature configurations may only be programmed into the secure PLD 410 if the bitstreams are successfully decrypted and authenticated using the application encryption key and the application public key. In the event the application configuration is successfully authenticated, secure PLD 410 may be configured to program/store the application configuration into one of configuration image sectors 452 or 454, to set a pre-authentication bit for the appropriate image, to erase the IPI from the PLD fabric 400, and/or to program the PLD fabric 400 according to the stored application configuration. The feature configuration may be programmed into one or more portions of the NVM 450. Other security checks to be performed prior to programming the secure PLD 410 may include validating the locked PLD manifest, checking trace ID matching within the locked PLD manifest, and/or other security checks.

At block 780, a logic device assembles a user device including a locked and programmed PLD. For example, a pick and place system of the user device assembler 540 may be configured to assemble the user device 610 including the locked secure PLD 410 generated at block 720 and programmed at block 770.

At block 790, a logic device audits a locked and programmed PLD based on an authenticatable manifest. For example, the secure PLD customer 510 may be configured to audit the locked secure PLD generated at block 720 and programmed at block 770 based on the authenticatable locked PLD manifest provided at block 740. In one embodiment, the external system 130 of the secure PLD customer 510 or downstream customer 550 may be configured to authenticate the locked PLD manifest provided by the secure PLD manufacturer 520 or secure PLD customer 510 at block 740, query the secure PLD 410 for its trace ID and/or device public key and compare to the trace ID and device public key in the locked PLD manifest, and to challenge the secure PLD 410 using the device public key, such as by encrypting a random number using the device public key, providing the resulting encrypted package to the secure PLD 410 in a device key challenge, and comparing the returned result to the original random number (e.g., a matching result indicates a successful audit of an operating secure PLD 410). Such auditing may in some embodiments take place prior to erasing the IPI configuration at block 770. Successful auditing indicates a functioning locked secure PLD 410.

Thus, by employing the systems and methods described herein, embodiments of the present disclosure are able to provide flexible and secure key provisioning and configuration of a secure PLD across a customer order of secure PLDs. A protected configuration of one customer cannot be used to program another customer personalized secure PLD or a blank secure PLD. Protected configurations may be programmed in-system or using an external device. Application keys may be decrypted only within a secure PLD. A customer may employ a key manifest to prevent device and/or application spoofing or over building. In various embodiments, programming keys and manifests are managed by one or more HSMs 526 of the secure PLD manufacturer 520 and/or secure PLD customer 510.

To help reduce or eliminate risk of loss or extraction of a customer's or a manufacturer's PLD fabric configurations/images, keys, and/or other secured data from a locked or unlocked secure PLD 410, or reprogramming of such data, secure PLD 410 may implement one or more lock policy management methodologies according to a lock policy plan and/or other secure asset arrangement, for example, that may be used by PLD fabric 400, configuration engine 440, and/or other elements of secure PLD 410 to manage read, write, and/or erase access and enforce lock statuses with respect to assets of secure PLD 410. In the most general sense, secure PLD 410 may be configured to assign lock statuses to various assets of secure PLD 410, such as ports of configuration I/O 448 and/or sectors of NVM 450, and/or to groups of such assets, to protect locked and/or unlocked operation of secure PLD 410, as described herein. For example, access to such assets may be locked against external access (e.g., via configuration I/O 448), internal access (e.g., via PLD fabric 400), both external and internal access, and/or locked against any further access regardless of access type. Such access may be controlled granularly, such as providing read, write, and/or erase access per asset associated with NVM 450, for example, or read and/or write access (e.g., data communication access) across configuration I/O 448. Lock statuses associated with assets or groups of assets may be implemented by lock status bits configured to manage, store, or represent the read, write, and/or erase access according to a particular lock policy plan or arrangement, for example, which can be modified to provide a particular desired granularity of secure asset management for secure PLD 410.

Figure 8:
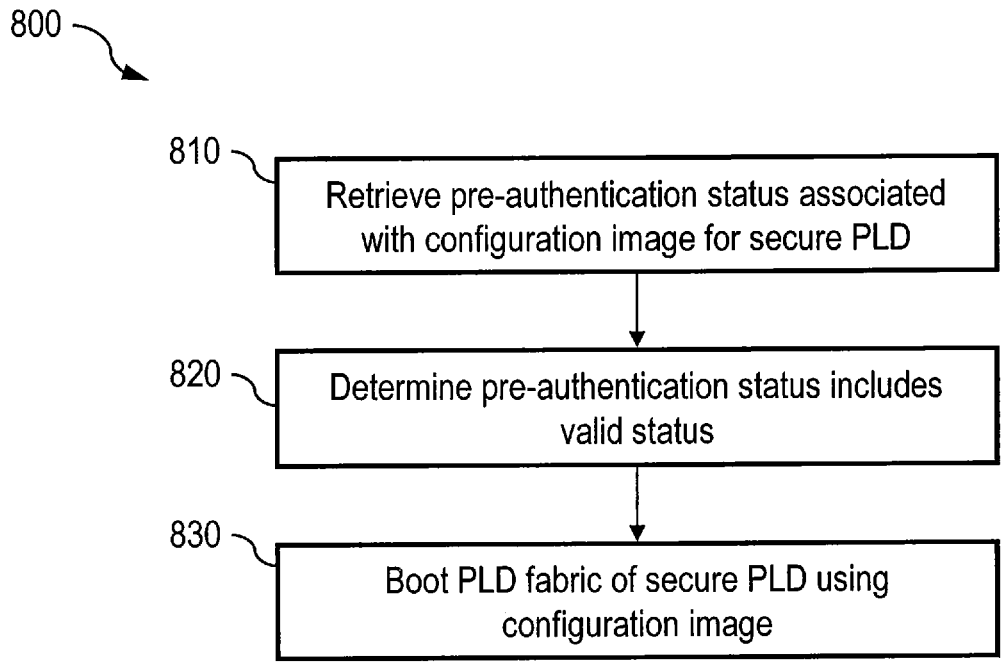
FIG. 8 illustrates a secure boot process for a secure PLD in accordance with an embodiment of the disclosure.

FIG. 8 illustrates a secure boot process 800 for the secure PLD 410 in accordance with an embodiment of the disclosure. In some embodiments, the operations of FIG. 8 may be implemented as software instructions executed by one or more logic devices associated with corresponding electronic devices, modules, processes, and/or structures depicted in FIGS. 1-7. More generally, the operations of FIG. 8 may be implemented with any combination of software instructions and/or electronic hardware (e.g., inductors, capacitors, amplifiers, actuators, or other analog and/or digital components). It should be appreciated that any step, sub-step, sub-process, or block of the process 800 may be performed in an order or arrangement different from the embodiments illustrated by FIG. 8. For example, in other embodiments, one or more blocks may be omitted from the process 800, and other blocks may be included. Furthermore, block inputs, block outputs, various sensor signals, sensor information, calibration parameters, and/or other operational parameters may be stored to one or more memories prior to moving to a following portion of the process 800. Although the process 800 is described with reference to systems, devices, processes, and elements of FIGS. 1-7, the process 800 may be performed by other systems, devices, and elements, and including a different selection of electronic systems, devices, elements, assemblies, and/or arrangements. At the initiation of the process 800, various system parameters may be populated by prior execution of a process similar to the process 800, for example, or may be initialized to zero and/or one or more values corresponding to typical, stored, and/or learned values derived from past operation of the process 800, as described herein.

At block 810, a logic device retrieves a pre-authentication status associated with a configuration image for a secure PLD. For example, the configuration engine 440 of the secure PLD 410 may be configured to retrieve a pre-authentication status (e.g., stored in other securable storage sectors 464 of the NVM 450) associated with configuration image 0 in the sector 452 or configuration image 1 in the sector 454 of the NVM 450, either of which may be used to program the PLD fabric 400 of the secure PLD 410. In other embodiments, the configuration engine 440 may be configured to retrieve a pre-authentication status associated with a configuration image stored on the external medium 136 and provided over the configuration I/O 448 and/or programmable I/O 404.

Prior to such retrieval, the configuration engine 440 may be configured to perform a pre-authentication process associated with the configuration image for the secure PLD 410 to determine the pre-authentication status associated with the configuration image retrieved in block 810. In various embodiments, such pre-authentication process may include determining an authentication engine result based, at least in part, on the configuration image, determining a design version corresponding to the configuration image and/or a pre-authentication digest or hash signature associated with the configuration image, and storing the authentication engine result, the design version corresponding to the configuration image, and/or the pre-authentication digest or hash signature as the pre-authentication status in the NVM 450. In some embodiments, such pre-authentication process may include determining an authentication engine result based, at least in part, on the configuration image, and selectively storing the authentication engine result as the pre-authentication status in the NVM based, at least in part, on the authentication engine result.

In various embodiments, an authentication engine may be implemented by and/or within the configuration engine 440, the security engine 420, and/or a combination of those and/or including other IC modules 480. An authentication engine may be configured to authenticate the configuration image, such as where the configuration image is signed using a private key associated with the secure PLD customer 510 for the secure PLD 410 or secure PLD manufacturer 520 of the secure PLD 410, a corresponding public key is stored in the NVM 450, and where the authenticating includes using the public key to verify that the configuration image is signed using the private key associated with the secure PLD customer 510 or secure PLD manufacturer 520. An authentication engine may be configured to determine the configuration image includes a complete configuration image for the secure PLD 410, such as by comparing a size of the configuration image to a corresponding expected size or checksum, for example. An authentication engine may be configured to validate the configuration image with respect to the secure PLD 410, which may include design version comparisons to rollback protection rulesets and/or other configuration images, functionality comparisons, serial number, device ID, and/or other comparisons, for example. In such embodiments, the authentication engine may be configured to provide a pass result when all such checks are passed, for example, and to provide a fail result when any of such checks fail. In general, such design version comparisons and/or validation may be performed by an authentication engine or may be performed as part of a pre-authentication process.

In one embodiment, the secure PLD 410 may be configured to authenticate a configuration image signed by an application or other private key using an application or other public key stored in the NVM 450 during a locking, programming, or other provisioning step in a provisioning process. In another embodiment, the secure PLD 410 may be configured to authenticate such configuration image by comparing a secure PLD trace ID in the configuration image with a trace ID stored in the MFG trim sector 456 and/or other sector of the NVM 450 or with the device ID 422 of the security engine 420, such that a matching trace ID in the configuration image indicates an authenticated configuration image. In further embodiments, such authentication process may include decrypting the configuration image using a public key stored in the NVM 450.

At block 820, a logic device determines a pre-authentication status includes a valid status. For example, the configuration engine 440 of the secure PLD 410 may be configured to determine an authentication engine result associated with the configuration image includes a pass result and/or determine or compute a pre-boot digest or hash signature associated with the configuration image and verify that the computed pre-boot hash signature matches a pre-authentication digest or hash signature (e.g., generated by a pre-authentication process) prior to booting the PLD fabric 400 using the configuration image, where the pre-authentication status includes the pre-authentication hash signature associated with the configuration image.

At block 830, a logic device boots a PLD fabric of a secure PLD using a configuration image. For example, the configuration engine 440 of the secure PLD 410 may be configured to retrieve configuration image 0 from the NVM 450, program the PLD fabric 400 according to configuration image 0, and initialize or wake up the PLD fabric 400 of the secure PLD 410. Upon booting configuration image 0, the PLD fabric 400 may be configured to set or update the device keys lock status 858 to allow write and/or erase access to the device keys sector 458 and/or UFM sector 462, to download/receive new keys through a secure channel (e.g., established by PLD fabric 400 over programmable I/O 404), to write the new keys to the UFM sector 462, to erase the device keys sector 458, to copy the new keys from the UFM sector 462 into the device keys sector 458, to download an update configuration image for the PLD fabric 400, to decrypt and/or authenticate the update configuration image using the new keys, and to store the update configuration image in one of the configuration image sectors 452 or 454 (and including setting the authentication bit to indicate the stored update configuration image is bootable without necessitating another authentication process) and/or boot the update configuration image. In various embodiments, the device keys lock status 858 may be updated to include a write disable and/or an erase disable lock status as against the configuration I/O 448 and/or PLD fabric 400. Such process allows embodiments to update keys and configuration images securely as part of a single or unified methodology.

In another embodiment, the configuration engine 440 and/or PLD fabric 400 may be configured to receive, validate, and/or authenticate an unlock request for a particular configuration image sector, and to unlock the particular configuration image sector for programming by the external system 130 and/or by the PLD fabric 400 according to an updated configuration image provided by the external system 130. The configuration engine 440 and/or PLD fabric 400 may also be configured to receive a lock request (e.g., identifying the updated configuration image stored in the configuration image sector 454) from the external system 130 over the configuration I/O 448 and through the configuration engine 440, and the configuration engine 440 and/or PLD fabric 400 may be configured to receive, validate, and/or authenticate the lock request, and to hard or soft lock the configuration image sector 454 against further external access.

Figure 9:
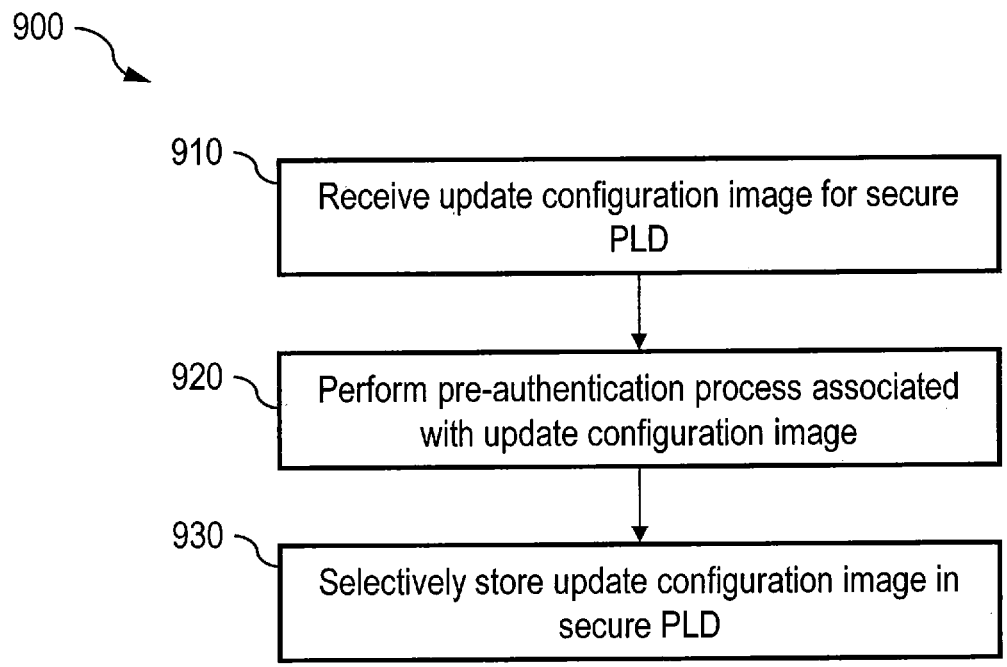
FIG. 9 illustrates a secure boot process for a secure PLD in accordance with an embodiment of the disclosure.

FIG. 9 illustrates a secure boot process 900 for secure PLD 410 in accordance with an embodiment of the disclosure. In some embodiments, the operations of FIG. 9 may be implemented as software instructions executed by one or more logic devices associated with corresponding electronic devices, modules, processes, and/or structures depicted in FIGS. 1-8. More generally, the operations of FIG. 9 may be implemented with any combination of software instructions and/or electronic hardware (e.g., inductors, capacitors, amplifiers, actuators, or other analog and/or digital components). It should be appreciated that any step, sub-step, sub-process, or block of the process 900 may be performed in an order or arrangement different from the embodiments illustrated by FIG. 9. For example, in other embodiments, one or more blocks may be omitted from the process 900, and other blocks may be included. Furthermore, block inputs, block outputs, various sensor signals, sensor information, calibration parameters, and/or other operational parameters may be stored to one or more memories prior to moving to a following portion of the process 900. Although the process 900 is described with reference to systems, devices, processes, and elements of FIGS. 1-8, the process 900 may be performed by other systems, devices, and elements, and including a different selection of electronic systems, devices, elements, assemblies, and/or arrangements. At the initiation of the process 900, various system parameters may be populated by prior execution of a process similar to the process 900, for example, or may be initialized to zero and/or one or more values corresponding to typical, stored, and/or learned values derived from past operation of the process 900, as described herein.

At block 910, a logic device receives an update configuration image for a secure PLD. For example, the configuration engine 440 of secure PLD 410 may be configured to receive an update configuration image over the configuration I/O 448 or programmable I/O 404 of the secure PLD 410, in an attempt to update either configuration image 0 or 1 in the NVM 450. In some embodiments, the configuration engine 440 may be configured to receive an update configuration image issued by the external system 130 of the secure PLD customer 510 or secure PLD manufacturer 520 coupled to the secure PLD 410 over the configuration I/O 448, for example, or issued by the PLD fabric 400 running a customer or manufacturer configuration programmed into the secure PLD 410.

At block 920, a logic device performs a pre-authentication process associated with an update configuration image. For example, the configuration engine 440 of the secure PLD 410 may be configured to perform a pre-authentication process associated with the update configuration image to determine a pre-authentication status associated with the update configuration image. In some embodiments, performing the pre-authentication process may include determining an authentication engine result based, at least in part, on the update configuration image, and selectively storing the authentication engine result as the pre-authentication status in the NVM 450 based, at least in part, on the authentication engine result. For example, if the authentication engine result includes a pass result, the configuration engine 440 may be configured to store the pass result as a valid status associated with the pre-authentication process and/or the received update configuration image. If the authentication engine result includes a fail result, the configuration engine 440 may be configured to omit the pre-authentication status or store the fail result as an invalid status associated with the pre-authentication process and/or the received update configuration image.

In additional embodiments, performing the pre-authentication process may include determining a design version corresponding to the received update configuration image and selectively validating the design version corresponding to the update configuration image based, at least in part, on rollback protection ruleset stored in the NVM 450, a secure boot mode associated with the secure PLD 410, and/or first and/or second design versions corresponding to respective first and/or second configuration images (e.g., configuration images 0 and 1) stored in the NVM 450.

At block 930, a logic device selectively stores an update configuration image in a secure PLD. For example, the configuration engine 440 of the secure PLD 410 may be configured to selectively store the update configuration image in the NVM 450 in place of a first or second configuration image (e.g., configuration images 0 or 1) based, at least in part, on the pre-authentication status determined in block 920 and a secure boot mode associated with secure PLD 410. For example, if the pre-authentication status associated with the update configuration image includes a valid status, the configuration engine 440 may be configured to store the update configuration image in the NVM 450 (e.g., over configuration 0 or 1) based, at least in part, on a design version identified in the pre-authentication status and a golden boot mode or a ping pong boot mode associated with the secure PLD 410. In embodiments where the secure boot mode associated with secure PLD 410 includes a golden boot mode, the storing the update configuration image in the NVM 450 may include identifying a first configuration image (e.g., configuration 0) as a golden configuration image and storing the update configuration image in NVM 450 in place of a second configuration image (e.g., in place of configuration 1). In embodiments where the secure boot mode associated with secure PLD 410 includes a ping pong boot mode, the storing the update configuration image in NVM 450 may include identifying a second configuration image (e.g., configuration 1) as an updateable configuration image and storing the update configuration image in NVM 450 in place of the second configuration image (e.g., in place of configuration 1).

If the pre-authentication status associated with the update configuration image includes an invalid status, the configuration engine 440 may be configured to erase the update configuration image or set related sectors in the NVM 450 to write and/or erase enabled. In various embodiments, once the configuration engine 440 overwrites configuration 0 or 1 with the update configuration image received in block 910, the configuration engine 440 may proceed with a fast secure boot process similar to process 800 of FIG. 8, including retrieving the pre-authentication status associated with the update configuration image from the NVM 450, verifying the retrieved pre-authentication status associated with the configuration image includes a valid status, and booting the PLD fabric 400 of the secure PLD 410 using the update configuration image. Such booting of the PLD fabric 400 may include retrieving the update configuration image from the NVM 450, programming the PLD fabric 400 according to the update configuration image and initializing the PLD fabric 400 of the secure PLD 410.

Thus, by employing the systems and methods described herein, embodiments of the present disclosure are able to provide flexible and secure booting for a secure PLD. A customer locked and/or otherwise provisioned secure PLD may be securely booted and/or updated without risking exposure of customer data and without incurring substantial downtime or repeated degraded performance associated with repetitive authentication of the same configuration image at boot time.

Figure 10:
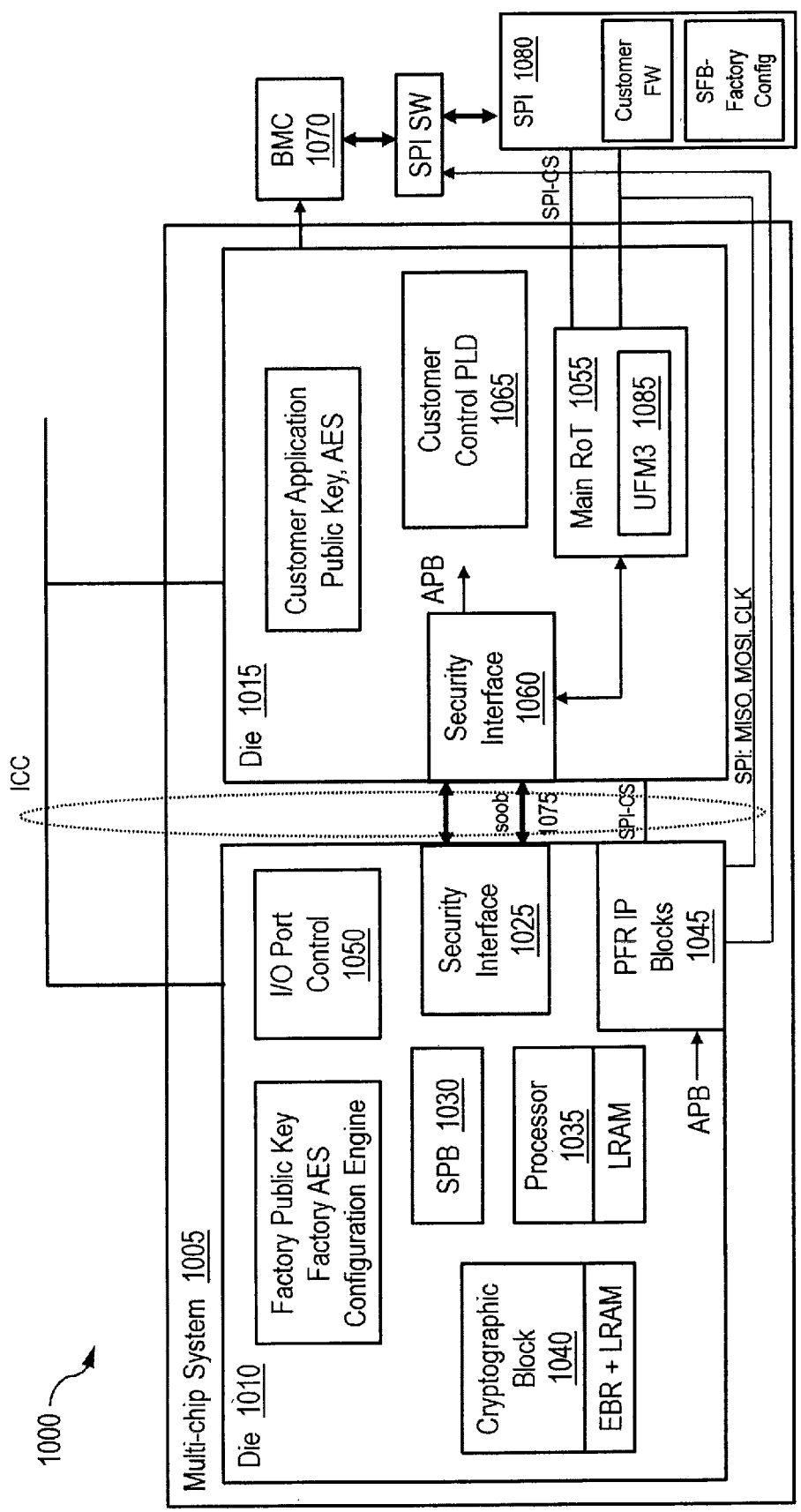
FIG. 10 illustrates a block diagram of a system including a multi-chip module system in accordance with an embodiment of the disclosure.

FIG. 10 illustrates a block diagram of a system 1000 including a multi-chip module system 805 in accordance with an embodiment of the disclosure. In various embodiments, the multi-chip system 1000 may be implemented by elements similar to those described with respect to the PLD 100 of FIG. 1, but with additional configurable and/or hard IP elements configured to facilitate operation of the multi-chip module system 1005 in a trusted computing application and/or architecture, and/or with respect to the secure PLD 410 of FIG. 4. In this regard, structures and functionality described with respect to the secure PLD 410 may be distributed across multiple chips of a multi-chip module system.

The multi-chip module system 1005 provides a module with multiple die, including die 1010 and die 1015 that are communicatively coupled and mounted in the module according to any of a variety of technologies (e.g., integrated multi-chip package). The multi-chip module system 1005 may include a substrate on which both the die 1010 and die 1015 are placed, with routing for communication channels defined in or on the substrate. The die 1010 and die 1015 may be mounted one on top of another. The die 1010 and/or die 1015 may also have another die mounted on or be mounted on it. Embodiments of the multi-chip module system 1005 may use for example, wafer-level chip scale packaging, or bare die flip chip or future technologies that allow mounting of die to a substrate, printed circuit board or the like and which support die to die physical connection along with communication (e.g., electrical and/or optical). The multi-chip module system 1005 presents a single interface to a larger system in which the multi-chip module system 1005 or with which it operates. Since the multi-chip module system 1005 includes at least two dice, the multi-chip module system 1005 may be referred to as a two-chip module system or dual-chip module system or multi-chip module system depending on number of dice. In some embodiments, the die 1010 may include, may implement, may be a part of, and/or may be referred to as including, implementing, or being a part of a system-on-chip function block (SFB). In some cases, the die 1010 includes programmable logic functionality (e.g., IC with FPGA fabric).

In various embodiments, the multi-chip module system 1005 is not provided as a conventional printed circuit board or a layout of numerous chips such as a motherboard. The multi-chip module system 1005 may be provided as a unitary package element. This unitary package of at least two dice provides heterogenous elements while having one or multiple programmable parts. The multi-chip module system may provide an integrated programmable logic functionality and security functionality. As an example, a first die may provide at least a portion of the programmable logic functionality and a second die may provide at least a portion of the security functionality. The dice may be provided on the same substrate. In some cases, inter-chip communication between the dice may be direct and do not go through any substrate component shared by the dice and/or between the dice and any other components. Furthermore, while each of one or more dice may be programmed according to a respective configuration bitstream indicative of user code, factory code may be included in one or more of these configuration bitstreams without explicit user instructions/design.

The die 1010 includes a secure interface 1025, a security protocol block (SPB) 1030, a processor 1035 (e.g., RISC-V-based processor), a cryptographic block 1040, PFR IP blocks 1045, an I/O port control 1050, and configuration engine (e.g., including factory public key and factory-AES key(s) or other data to support other encryption and/or authentication technologies such as ECDSA). The die 1015 includes a main root of trust (MRoT) 1055, a secure interface 1060, a user/customer control PLD 1065, a customer application public key, and memory (e.g., on-chip flash memory for storing one or more configuration images for the die 1015), and may include bulk encryption key(s) such as an AES key. The die 1015 is communicatively connected to a baseboard management controller (BMC) 1070.

In some embodiments, the secure interface 1060 of the die 1015 and the main root of trust 1055 of the die 1015 may be presented to the user as a hardware block. The secure interface 1025 of the die 1010 and the secure interface 1060 of the die 1015 may collectively implement secure inter-chip communication between the die 1010 and the die 1015. In this regard, in some aspects, appropriate authentication is performed between the die 1010 and the die 1015 such that trust in both directions is established between the die 1010 and the die 1015.

The die 1010 may include/implement an embedded security block (e.g., also referred to as a security engine) to provide a hard IP resource configured to provide various security functions for use by PLD fabric. The secure interface 1025 may be used to facilitate intra-chip communication between components of the die 1010 and inter-chip communication (e.g., according to an I²C protocol and/or other inter-chip communication protocol) between the die 1010 and the die 1015. Within the die 1010, the secure interface 1025 may facilitate communication with the SPB 1030 through an out-of-band (OOB) interface. The secure interface 1025 may allow interrupts to pass through to the processor 1035. In some cases, up to eight interrupts from the die 1020 may be activated. The secure interface 1025 may transfer I/O control messages received from a synchronous serial interface (551) OOB link to corresponding I/Os and/or transfer status of an I/O of the die 1010 to the 551 through OOB. The secure interface 1025 may extend a master reset from the main root of trust 1055 to the SPB 1030.

The secure interface 1025 may communicate with the die 1015 through a secure communication OOB line 1075. A key exchange, such as one according to ECDH, may be used to facilitate communication between the die 1010 and the die 1015. IP may be added into a factory bit stream of the die 1010. In some cases, the secure interface 1025 may enable the processor 1035 as an inter-chip communication interface master after receiving confirmation from the SPB 1030. The confirmation may be provided by the main root of trust 1055 on the secure OOB line 1075.

In some embodiments, a secure OOB (SOOB) link, such as the secure communication OOB line/path 1075, may allow ECDH key exchange and/or encryption of inter-chip communication (e.g., encryption of I²C communication). In some cases, the encryption may be for all inter-chip communication except a read status command. For the key exchange, public keys may be exchanged between the BMC 1070 and the die 1015. The die 1015 may create a private key from a TRNG (e.g., the TRNG 424) and derive public keys. As an example, a shared secret AES key (e.g., 128 bit AES key) and nonce (e.g., initial 128-bit nonce) may be used. The embedded security block (e.g., implemented by the die 1010) may be used to drive the shared secret AES key and nonce from the private key created by the die 1015 and the public key of the BMC 1070. The BMC 1070 may perform the same or similar procedure using the public key associated with the die 1015 and the private key associated with the BMC 1070. Standard I²C commands may be encapsulated into an encrypted write with unique nonce. The nonce may prevent replay attack. After every encrypted write, the BMC 1070 may read a new nonce. The BMC 1070 may append encrypted and obfuscated nonce(s) to a next write. An image associated with the die 1010 (e.g., denoted as "SFB-factory config" in FIG. 10) may be stored in an SRI memory 1080 of the BMC 1070. A customer image (e.g., designed by the customer, also referred to as customer firmware image or customer firmware, and denoted as "customer FW" in FIG. 10) may also be stored in the SRI memory 1080. Address locations of the customer image and the factory image may be protected by PFR. To boot up the die 1010, the die 1010 may read customer and factory bit streams from SPI memories, such as the SPI memory 880. To reduce the boot time, a Hash Message Authentication Code (HMAC) signature may be used as opposed to an asymmetric key-based signature. Selection between SRI and quad SRI (QSPI) may depend on the BMC 1070.

The SPB 1030 may be a first IP to wake up on the die 1010 after the SPB 1030 is configured through an SRI memory interface. The SRI may store firmware, such as host processor boot firmware. By nature of being first to wake up on the die 1010, the SPB 1030 is used to establish a trust relationship between the die 1010 and the die 1015. The SPB 1030 may establish the trust relationship by communicating with the main root of trust 1055 of the die 1015 and validating information that is received from the die 1015. The SPB 1030 may establish a secure communication (e.g., via a secure OOB communication via the secure OOB line 1075) with the main root of trust 1055 via the secure interface 1025 and an SSI. In some cases, the secure communication may use ECDH and nonce to protect against, for example, replay attacks and other snoop attacks (e.g., similar to secure communication with a BMC).

The SPB 1030 may communicate with the main root of trust 1055 to get post configuration information associated with the die 1010. The post configuration information may include a start address of the customer image in the SRI flash memory 1080, an approved version number packet associated with the die 1010, and PFR engine configuration data associated with the die 1010. The start address of the customer image may be provided by the user and/or from usage of the multi-chip module system 1005 by the user, whereas the version number packet and the PFR engine configuration data are factory-provided. The SPB 1030 may validate (e.g., after decryption) the version number packet and type of factory configuration associated with the die 1010 and enable code execution if (e.g., only if) the version number test passes. Otherwise, the SPB 1030 may initiate a fault log in the die 1015 (e.g., in the customer UFM of the die 1015). The SPB 1030 may configure the PFR IP blocks 1045 and the I/O port control 1050 as defined in the PFR engine configuration data of the die 1010 that is stored in a UFM3 1080 via the main root of trust 1055. In some cases, contents of the UFM3 1080 may include a start address of an image (denoted as SFB-factory config) associated with the die 1010 in the SRI flash memory 1080, the start address associated with the customer image (denoted as customer FW) in the SRI flash memory 1080, an approved version number packet associated with the die 1010, and the PFR engine configuration data associated with the die 1010. In some cases, the version number packet associated with the die 1010 includes encrypted data associated with the die 1010, a hash of a factory public key and a factory image signature associated with the die 1010, a version number of Diamond that the version number packet is provisioned in, a signature of this packet that can be verified by a public key that is provisioned into the main root of trust 1055. The encrypted data associated with the die 1010 may be signed with a factory private key and may include a type of factory configuration and a version number associated with the image associated with the die 1010. Encryption may be according to factory AES.

The SPB 1030 may configure an PFR streamer section of the die 1010 with a customer image start address and length. The SPB 1030 may read the customer image corresponding to an image the main root of trust 1055 boots from (e.g., to maintain a one-to-one relationship between configuration from the customer memory and configuration of the die 815). For example, configuration 0 (e.g., first image for configuring the die 1015) stored in an NVM (e.g., the NVM 450) on the die 1015 may be associated with/correspond to customer firmware image 0 whereas configuration 1 (e.g., second image for configuring the die 1015) stored in the NVM on the die 1015 may be associated with/correspond to customer firmware image 1. In some cases, the streamer may obtain the image from the external SRI flash 1080. After the image is loaded, the streamer may authenticate the image using the public key received from the main root of trust 1055. In some cases, by way of non-limiting examples, the image may be authenticated with an HMAC key (e.g., 256-bit HMAC key) or an ECC public key (e.g., 512-bit ECC public key). In some cases, user PFR code may be encrypted with a user key (e.g., user AES key). In some implementations, user PFR code is not to be encrypted with user AES key (e.g., to reduce complexity). In other implementations, user PFR code may be encrypted with user AES key.

The SPB 1030 may read an encrypted image from the customer memory (e.g., customer LRAM), then provide the encrypted image to a hash engine and decrypt. In other cases, the SPB 1030 may decrypt the image and then feed the decrypted image to the hash engine (e.g., depending on encryption and sign policies). After successful loading, the SPB 1030 may send the public key and the decrypted signature associated with the die 1010 to the main root of trust 1055 and wait for a master reset release. After receiving the master reset, all resets (e.g., including reset for the processor 1035) within the die 1010 are removed. At this time, the processor 1035 may communicate with peripherals in the die 1015. In some cases, the SPB 1030 may allow for encrypting/decrypting packets for transmission over the inter-chip interface or for adding/verifying HMAC signature for the commands.

The processor 1035 may facilitate/orchestrate PFR. The processor 1035 may communicate with the die 1015 only after its master inter-chip communication status has been enabled by the main root of trust 1055. In some cases, the processor 1035 may be customer controlled (e.g., fully customer controlled). In this regard, the user may be provided access to the processor 1035 and run user code on the processor 1035. The processor 1035 may be presented to the user as a hardened subsystem. The processor 1035 may be used as an interrupt controller to support interrupts in the die 1010 and user interrupts (e.g., up to eight in some cases) from peripherals of the die 1015 and/or OOB I²C interrupt.

The processor 1035 may have access to UFM and configuration store in the die 1015. The processor 1035 may read a manifest (e.g., stored in UFM0 to 2). The processor 835 may read a bit stream stored in configuration associated with the die 1015 via a bus (e.g., wishbone bus). The processor 1035 may modify lock policy settings in the die 1015. In some cases, such lock modification functionality may be performed using the secure OOB link 1075 between the SPB 1030 and the main root of trust 1055. In some cases, messages back and forth via inter-chip communication links can be encrypted or signed using the SPB 1030 and the main root of trust 1055.

The PFR IP blocks 1045 may perform functions of a streamer and a monitor for SPI and QSPI. In some cases, pin numbers may be fixed. The SPI interface I/Os of these IPs may cover a number of architectures. Architecture-specific (e.g., multiple SPI memory or single SPI memory with or without an external SPI switch, SPI switch/MUX, etc.) I/O interface functionality may be configured through bits stored in the UFM (e.g., the UFM3 1085). In some cases, unused I/Os (e.g., all unused I/Os) may be used by a control PLD virtual I/O. The PFR IPs of the PFR IP blocks 1045 may be controlled by the processor 835 executing the customer's PFR orchestration code. The PFR IPs may include I²C filters (e.g., six I²C filters in some implementations). The IPs may integrate the OOB interface that the processor 1035 may use. The PFR IP blocks 1045 are connected to the cryptographic block 1040. The cryptographic block 1050 may include the security engine 420 of FIG. 4. A master SPI block may have a streaming interface that may send/feed data directly to the cryptographic block 1040. Such communication allows authentication of data, such as customer firmware. An SPI monitor may be designed for PFR.

The I/O port control 1050 may facilitate control of I/Os of the die 1010. I/Os of the die 810 may be controlled by user logic in the die 1015 and/or may be used as I/O ports of the processor 1035. A pin configuration may be determined by the UFM3 configuration data. Additional functions may be attached to these I/O pins. An I/O pin or set of pins may determine a hardened function or port of the processor 1035, or controlled by the control PLD logic. In some cases, I/Os of the die 1010 may appear to the user as if they were I/Os of the die 1015. Such interfacing to the user may be facilitated through an appropriate inter-chip communication protocol(s).

The die 1015 may store customer secure images and data and provide customer control PLD functionality. The die 1015 includes an NVM (e.g., the NVM 450 of FIG. 4) not explicitly shown in FIG. 10 that stores one or more configuration images (e.g., also referred to as on-chip configuration images) for configuring the die 1015. Each of these configuration images may be associated with/correspond to a respective corresponding customer firmware image stored in the SPI memory 1080. The user/customer control PLD 1065 may be used as a control PLD. The control PLD is generally the first device to be turned on in a system and the last device to turn off after shutting other components. The control PLD 1065 may provide PFR-related functions. PFR coverage may be extended by including streamer and monitor functions in the die 1015. Bus latency and bus speed requirements are generally expected to be the same as that of PFR implementation in the die 1015. The user control PLD 1065 may be controlled by the processor 1035 through the inter-chip communication interface. The user control PLD 1065 may instantiate a peripheral. A master clock may be sourced by the processor 1035. In some cases, a message may be encrypted before transmission or decrypted after receiving the packet (e.g., signed and verified) using the main root of trust 1055. In some cases, there is no limit on the size of the packet. The user control PLD 1065 may provide a path for all flash assets and protection policy of the die 1015 (e.g., except UFM3 in some cases). The user control PLD 1065 may perform functionality using secure messaging or signed messaging on the inter-chip communication links operated according to any appropriate protocols and physical layer signaling mechanisms.

In the multi-chip module system 1005, the secure interface 1025, SPB 1030, processor 1035, cryptographic block 1040, PFR IP blocks 1045, I/O port control 1050, main root of trust 1055, security interface 1060, and SFB-factory config in the SPI memory 1080 may include manufacturer-defined/supplied content. A memory coupled to the processor 1035, the customer image in the SPI memory 1080, the customer application public key and AES, and the customer control PLD 1065 may include customer-designed content. In some cases, the customer application public key and AES and the customer control PLD 1065 may be provided as soft logic in the implementation (e.g., although it may appear as hardened logic to the user). Due to programmability, more functionality may be provided through an in-field update. The die 1010 may provide a co-processor to the die 1015 with limited customer access.

In general, inter-chip communication (ICC) may include double data rate (DDR) communication, secure OOB communication, and/or generally any inter-chip communication via one or more wires. Control signals, such as clock signals, read signals, and write signals, may be communicated via the inter-chip communication. Interrupt encoding may be performed using a round-robin scan of interrupts associated with the die 1015. A frame synchronization may be used. Pins may be utilized for BMC SPI connection and JTAG. JTAG ports are generally disabled and not available for access. In some cases, a JTAG boundary scan may be enabled when the device is shipped and then disabled when the device is operational.

In some embodiments, a boot process for the multi-chip module system 1005 is provided as follows. The die 1015 may boot up prior to the die 1010. Configuration data for the die 1015 may be stored in on-chip memory (e.g., also referred to as internal memory) on the die 1015. The on-chip memory may be on-chip flash memory and/or may implemented similar to the NVM 450 of FIG. 4. Such configuration may involve at least the main root of trust 1055 and the security interface 1060. In cases with customer design, the customer control PLD 1065 and the customer application public key and AES blocks on the die 1015 are also configured. The die 1015 may come out of reset and load its configuration bitstream from the on-chip memory. The die 1015 may then perform authentication (e.g., using a security engine on the die 1015) and decryption. In some cases, a full authentication process may be bypassed in implementations where a pre-authentication bit may be set. If the configuration data for the die 1015 is changed, the pre-authentication bit is cleared (e.g., using hardware mechanisms) or otherwise set to a value indicating that a full authentication process cannot be bypassed.

Once the die 1015 is booted up and its design is loaded, the die 1015 may release a reset on the die 1010 to allow the die 1010 to be configured. The die 1010 may initiate booting through a master SPI interface. The die 1010 may initiate a fetch from a predetermined address (e.g., an Address 0) in the external SPI memory 1080 (e.g., external SPI flash). The die 1015 is also connected to the master SPI interface and temporarily acts as an external flash to intercept the fetch from the die 1010 and sends back a jump instruction. The jump instruction provides the die 1010 with the address from which to fetch the SFB-factory configuration image in the SPI memory 1080. The die 1015 may then disconnect and the die 1010 may fetch the SFB-factory configuration image from the address in the SPI memory 1080.

After the die 1010 is booted up, the die 1010 communicates with the die 1015 to set up inter-chip communication and establish a trust relationship. Establishment of a trust relationship may include appropriate operations associated with handshakes, including key exchanges. The trust relationship allows the die 1010 and the die 1015 to identify each other. For example, if the die 1015 is swapped out with a new die, the die 1010 is able to detect that the die 1015 and will not treat the new die as if it were the die 1015. After the communication and trust relationship are established, the die 1010 may read data from the UFM3 1085 of the die 1015. The data may include the PFR engine configuration image, which the die 1010 may use to program peripherals (e.g., SPI monitors) on the die 1010. After the die 1010 programs its peripherals according to the PFR engine configuration image, the die 1010 may load the customer firmware image from the SPI memory 1080, authenticate the customer firmware image, and start running the customer's firmware. In some cases, the customer firmware is run on the processor 1035 (e.g., PFR CPU) of the die 1010.

Figure 11:
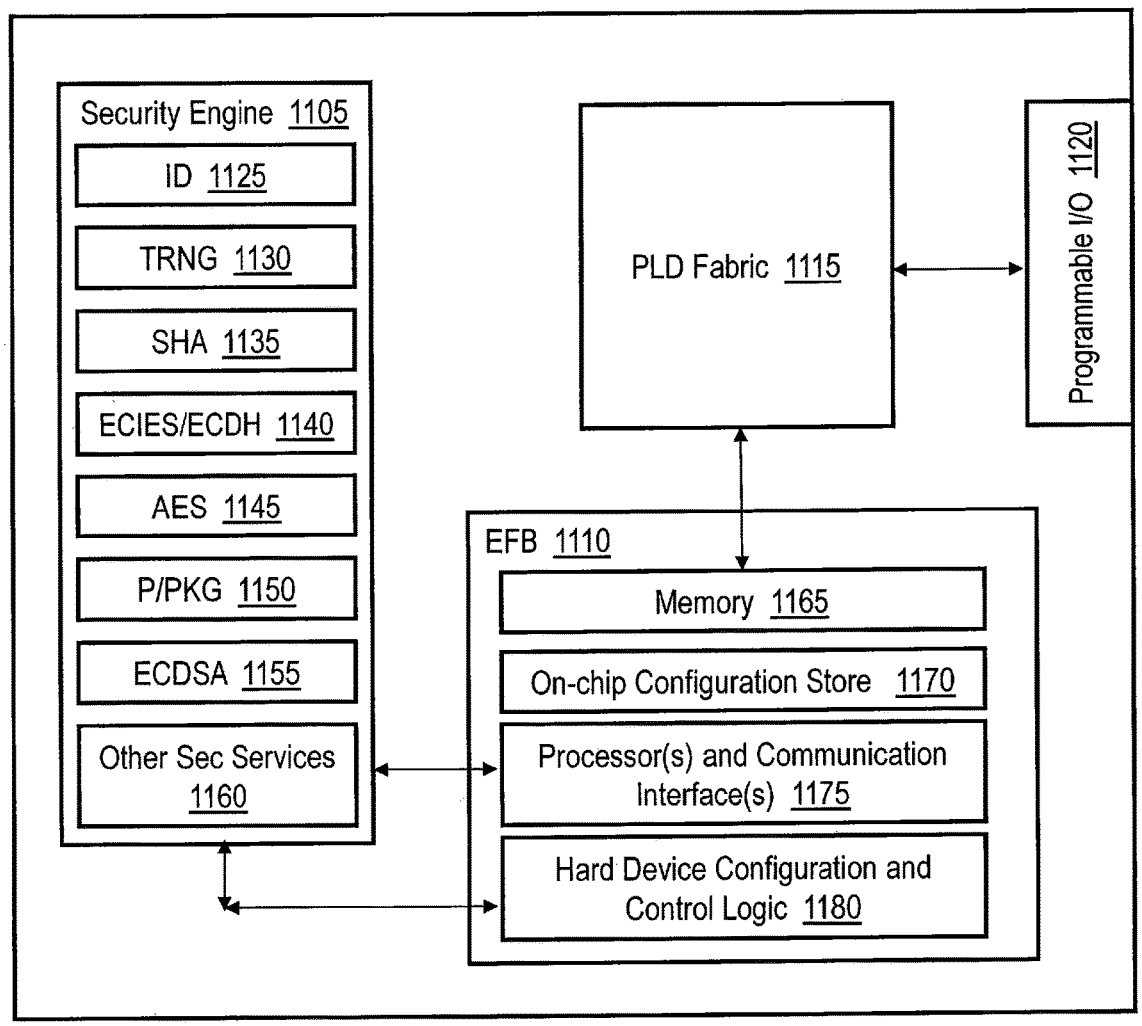
FIG. 11 illustrates a block diagram of a system in accordance with an embodiment of the disclosure.

FIG. 11 illustrates a block diagram of a system 1100 in accordance with an embodiment of the disclosure. In some embodiments, the system 1100 may be implemented according to the multi-chip module system 1005 of FIG. 10 and/or the secure PLD 410 of FIG. 4 (e.g., distributed over multiple die). The description of FIGS. 10 and 4 generally applies to FIG. 11, with examples of differences and other description provided herein.

The system 1100 includes a security engine 1105 (e.g., also referred to as an embedded security block), an embedded function block (EFB) 1110, a PLD fabric 1115, and a programmable I/O 1120. These various components are linked via various buses. The security engine 1105 includes a device ID 1125, a TRNG 1130, a SHA service 1135 (e.g., an SHA-256/384, SHA-2, and/or SHA-3 service), an elliptic curve integrated encryption scheme (ECIES) service and ECDH service 940, an AES service 1145, a P/PKG 1150, an ECDSA authentication service 1155 (e.g., an ECDSA256 or ECDSA 384 service), and/or other security services 1160. The security engine 1105 may be communicatively linked to the embedded function block 1110 over one or more secure buses. The secure bus(es) may be configured to allow the embedded function block 1110 to access and/or modify security functions, data, and/or configurations of the security engine 1105. In general, the secure bus(es) may be configured to provide encrypted and/or otherwise secured communication between the security engine 1105 and/or other elements of the system 1100.

The embedded function block 1110 includes memory 1165 (e.g., flash memory), on-chip configuration store 1170, a processor(s) and communication interface(s) 1175, and a hard device configuration and control logic 1180. The memory 1165 may store keys, locks, features, manifests, and/or other data. The on-chip configuration store 1170 may store configuration images (e.g., for configuring the die 1015 of FIG. 10). For example, the on-chip configuration store 1170 may be an on-chip dual configuration store that stores a first image and a second image. The first image may be amenable to be updated in field whereas the second image may remain fixed to provide a known, backup image if the first image is corrupted. Each of the images in the on-chip configuration store 1170 may correspond to a customer image stored in external memory (e.g., external flash). The processor(s) and interface(s) 1175 may provide configurable PFR, processors (e.g., RISC-V processors), RAM, master/slave inter-chip communications (e.g., according to I³C protocol), eSPI, and so forth. The PLD fabric 1110 may implement/provide flexible user security algorithms, flexible I/O protocol, and/or dynamic control of external configuration ports.

Figure 12:
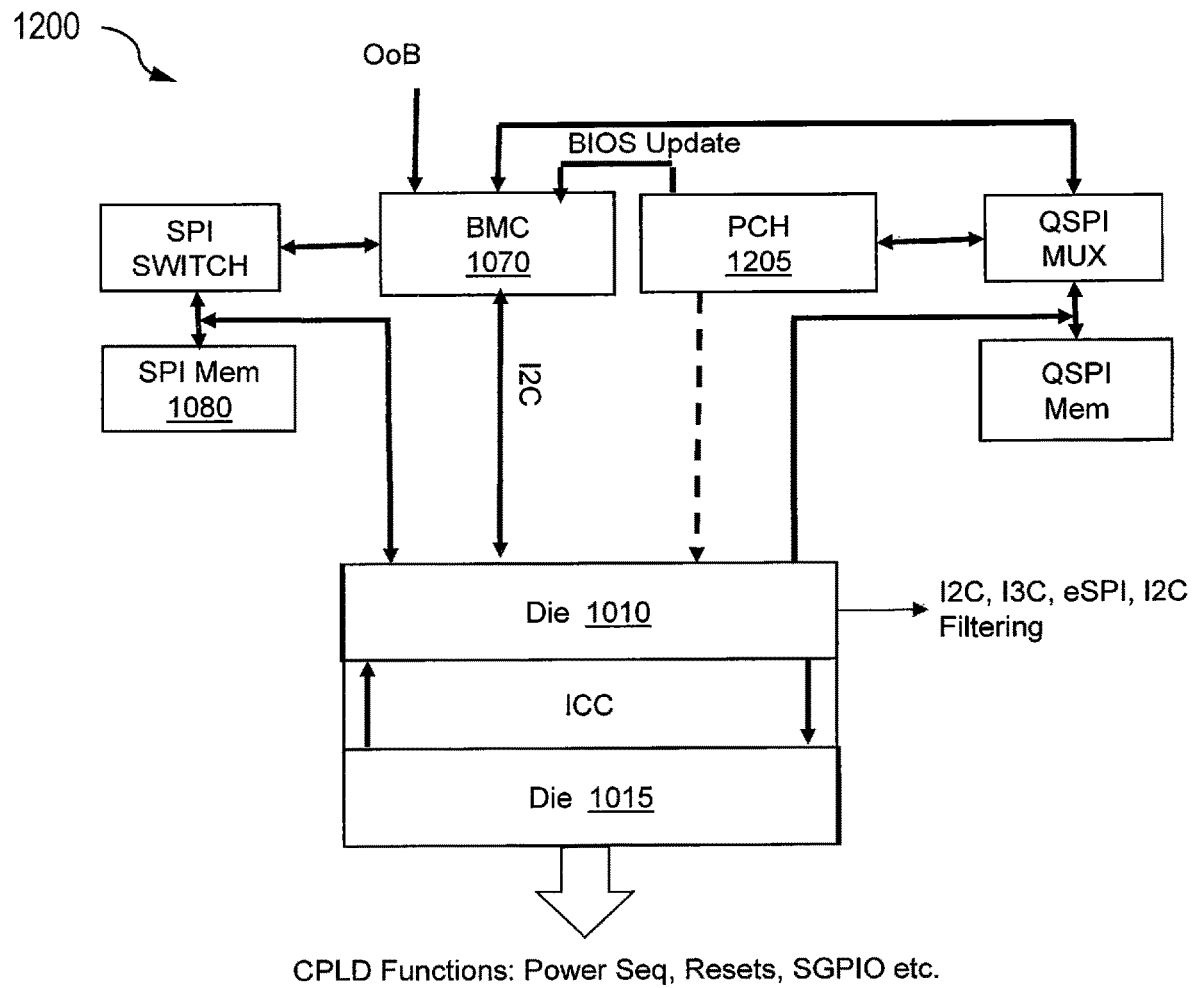
FIG. 12 illustrates an example system architecture/platform with the multi-chip module system of FIG. 10 in accordance with an embodiment of the present disclosure.

FIG. 12 illustrates an example system architecture/platform 1200 with the multi-chip module system 1005 of FIG. 10 in accordance with an embodiment of the present disclosure. In some embodiments, the system architecture 1200 may be implemented according to the multi-chip module system 1005 of FIG. 10 and/or the secure PLD 410 of FIG. 4 (e.g., distributed over multiple die). The description of FIGS. 10 and 4 generally applies to FIG. 12, with examples of differences and other description provided herein.

The architecture 1200 includes the multi-chip module system 1005, the BMC 1070, and a platform controller hub (PCH) 1205. Various processors may boot out of the SPI or quad SPI memory. The configuration allows the FPGA to boot itself, verify each of the SPI memories, and release those components to boot (e.g., assuming the memories are correct and appropriately signed). If the SPI memories are not correct, the multi-chip module system 1005 may perform operations such as shutting the system down or attempting to reconfigure from another source depending on the customer's preference. After the system has booted, the multi-chip module system 1005 may also monitor access to the various SPI memories to prevent unauthorized writes.

An image associated with the die 1010 may be stored in the SPI memory 1080 of the BMC 1070. After booting from the image, the die 1010 may handle PFR functions for the BMC SPI memory 1080. To provide detection and recovery according to PFR guidelines, the image may be validated by a PFR block (e.g., a hardened PFR block) of the die 1010. The PFR block may perform operations based on elliptic curve cryptography (e.g., ECC384) and/or a manifest stored in the die 1015 accessed during initialization. The die 1015 may start the board securely using a control PLD interface driven by a processor (e.g., RISC-V processor) of the die 1010. Recovery/update images for a BMC, a PCH, and die 1010 may be received from an OOB channel. Protection according to PFR guidelines may be handled primarily by the die 1010. As an example, I²C filtering may be handled by the die 1010. In some cases, special hardware interface may be handled through IPs of the die 1015. Other server related interfaces may provide/include I³C and eSPI hardware interfaces/protocols and bridging with other interfaces (e.g., universal asynchronous receiver-transmitter (UART) for super I/O). The bridging with other interfaces may be handled by the RISC-V processor of the die 1010. In some cases, LUTs of the die 1015 may be used for CPLD. In some cases, the configuration PFR may include soft logic provided to a user/customer that is compiled together with the user's design. CPLD functions may include power sequencing, resets, SGPIO, among others. The die 1010 and die 1015 together may implement all of PFR defined a relevant specification (e.g., PFR2.0); many of the functions may be implemented in die 1010, while certain elements may be implemented in the die 1015, and in such case, those elements are slaves (controlled or directed by) a processor (e.g., a soft processor, such as a RISC-V) implemented in the die 1010. Therefore, PFR functionality may be distributed among two or more separate die within the multi-chip module system 1005, even though an external interface presents the implementation as being a unified, single chip implementation.

With reference back to FIG. 4, in various embodiments, the configuration engine 440 and/or PLD fabric 400 may be configured to update one or more configuration images stored in configuration image sectors 452 and 454, for example, and/or UFM sector 462. In one embodiment, the configuration engine 440 and/or PLD fabric 400 may be configured to receive a new configuration image over the configuration I/O 448 (e.g., through the configuration engine 440) and/or programmable I/O 404, to decrypt and/or authenticate the new configuration image using a device key stored in the device keys sector 458, to determine a lock status associated with one of the configuration image sectors 452 or 454 includes a write enable and/or an erase enable lock status, and to store the new configuration image in one of the configuration image sectors 452 or 454 (e.g., while setting an authentication bit to indicate the stored new configuration image is bootable without necessitating an additional authentication process) and/or to boot the new configuration image.

Upon booting the new configuration image, the PLD fabric 400 may be configured to set or update device keys lock status to allow write and/or erase access to the device keys sector 458 and/or UFM sector 462, to download/receive new keys through a secure channel (e.g., established by PLD fabric 400 over programmable I/O 404), to write the new keys to the UFM sector 462, to erase the device keys sector 458, to copy the new keys from the UFM sector 462 into the device keys sector 458, to download an additional configuration image for the PLD fabric 400, to decrypt and/or authenticate the additional new configuration image using the new keys, and to store the additional new configuration image in one of the configuration image sectors 452 or 454 (and including setting the authentication bit to indicate the stored additional new configuration image is bootable without necessitating another authentication process) and/or boot the new configuration image. Such process allows embodiments to update keys and configuration images securely as part of a single or unified methodology.

In another embodiment, the configuration engine 440 and/or PLD fabric 400 may be configured to receive, validate, and/or authenticate an unlock request for a particular configuration image sector, and to unlock the particular configuration image sector for programming by the external system 130 and/or by the PLD fabric 400 according to an updated configuration image provided by the external system 130. The configuration engine 440 and/or PLD fabric 400 may also be configured to receive a lock request (e.g., identifying the updated configuration image stored in the configuration image sector 454) from the external system 130 over the configuration I/O 448 and through the configuration engine 440, and the configuration engine 440 and/or PLD fabric 400 may be configured to receive, validate, and/or authenticate the lock request, and to hard or soft lock configuration image sector 454 against further external access.

In various embodiments, other securable assets of the secure PLD 410 may be securely updated using similar techniques. For example, the configuration engine 440 and/or PLD fabric 400 of the secure PLD 410 may be configured to receive an updated MFG trim, trace ID, device keys, an IPI, and/or other data (e.g., issued/generated by the external system 130 and/or HSM 526 of the secure PLD customer 510 or secure PLD manufacturer 520 coupled to the secure PLD 410 over the configuration I/O 448, for example, or over programmable I/O 404) configured to re-provision secure PLD 410 and/or place the secure PLD 410 in condition to be re-provisioned using a process similar to provisioning process 700 of FIG. 7, thereby allowing the secure PLD 410 to be placed in service with different or updated operational data.

Authentication of a configuration image using an asymmetric key encryption/authentication scheme (such as RSA or ECDSA) (referred to herein as "authentication" for simplicity) is one way to increase security for devices, including to enable validated and secure device booting. Secure device booting is an important element in providing a complete stack of secure functionality, from a hardware root of trust through secure application layer security. For example, authentication of configuration images is helpful to ensure that a configuration image hasn't been modified in transit. While some devices have relatively small firmware images, some devices have much larger and more complex images. For example, a PLD fabric of secure PLD 410 can have a very large configuration image.

For many PLDs, authentication can be computation intensive and induce a large delay in booting time. For example, a 30K FPGA has approximately six million configuration bits and would typically (assuming a 150 MHz clock) require about 10 ms to write a configuration image into the PLD fabric without any authentication. In some embodiments, a PLD may have no onboard non-volatile memory or may otherwise be configured to read a configuration image from an external non-volatile memory. It could be relatively easy to subvert such external non-volatile memory with an unauthorized configuration bitstream, as so authenticating the configuration bitstream can be an important feature for a system where security is an important attribute. However, authentication with ECDSA could add approximately seven million cycles of computation, which would take an additional 50 ms to finish under the same scenario. Thus, providing authentication for such PLD could increase boot time by about five times in such a scenario, which can present a large performance penalty. Even when a PLD includes onboard non-volatile storage for a configuration image, it should not be assumed that the configuration image is valid simply because it is stored on the chip.

In various embodiments, the secure PLD 410 may include sufficient on-board non-volatile storage (e.g., the NVM 450) for multiple on-die configuration images. In some usage models of such a capability, there is a need to boot from last known good image until an updated image has been validated, or to attempt to boot from a latest image, and but use an older image as secure back up in case the latest image booting fails. Such functionality allows a seamless in field system upgrade in which a device is much less likely to be "bricked" in the field by a remote update. Customers/users/managers also need a reliable method to obtain authenticated information about which configuration image is being used by the secure PLD 410 and the security status of the secure PLD 410 and/or the configuration image.

In some embodiments, the secure PLD 410 may be configured to conduct a dry run on configuration data or image that is received, the dry run including performing at least a check for integrity of the configuration data (e.g., that the configuration image is complete and has not inadvertently been truncated or damaged in transit). The dry run also can include authenticating a source of the configuration data, using a variety of techniques described herein, including the provisioning and asset management techniques described herein. The dry run also can include performing other validity checks on the configuration data that relate to architectural specifics or other requirements imposed by the secure PLD 410 itself. The configuration data can be obtained from an external port, which can receive it from a flash memory, or from a network interface for example. In some implementations, the configuration data can be stored before the dry run occurs, but a flag or status may be set to allow or prevent usage of that configuration data for actually configuring the PLD (e.g., the PLD fabric 400). Depending on an approach for the integrity check, the integrity check can be conducted while the data is being received, or it can be performed after an entire image is received. In some embodiments, both authentication and integrity can be verified using any one or combination of protocols described herein. The configuration data may be encrypted or unencrypted in transit and/or while stored. If encrypted, the integrity check may be performed on the encrypted data. In various embodiments, the secure PLD 410 includes the security engine 420, which may be configured to implement cryptographic primitives, and may also be able to generate asymmetric key pairs, and/or random numbers for use in various encryption/authentication and/or communication schemes.

For example, the secure PLD 410 may be configured to provide a public key that it generates to a source of configuration data (e.g., the secure PLD customer 510), and that source of configuration data may use that public key to encrypt configuration data, and other data, such as an HMAC of the configuration data, to be returned to the secure PLD 410. The HMAC may be signed by a private key of the source, and the public key of the source may also be provided to secure PLD 410, which can use the public key in authenticating the source of the configuration data package. In some implementations, authentication of a configuration data source can be required before integrity checks. Some implementations require that the authentication and integrity check be conducted atomically—meaning that in the context of the secure PLD 410, the portions of the secure PLD 410 participating in the authentication and integrity check are not handling any other intervening tasks, participating in I/O, for example. The secure PLD 410 may also undertake obfuscatory countermeasures against side-channel attacks. Other approaches to configuration data integrity, source authentication, and privacy of the configuration data may be implemented.

Once the relevant authentication, integrity, and/or validity checks have been passed, then the secure PLD 410 can set a flag or status that allows the configuration data, as stored in secure PLD 410 itself, to be used for configuring or programming PLD fabric 400 henceforth. The area or sector within the NVM 450 storing the configuration data may be set to not allow write operations. Some implementations may allow reads of the configuration data, while some may disallow all access (e.g., except by configuration engine 440, for example). If permissions are set to again allow a write to any memory location storing previously verified configuration data, the pre-authentication flag or status can be cleared, meaning that the configuration data is no longer considered pre-authenticated or available for use in programming the PLD fabric 400. The clearing of the flag could occur atomically with the change in permissions to the memory locations. If there is a command or other situation where such configuration data is indicated for use, then the authentication and integrity checks must again be performed. Configuration data/images may be stored encrypted or unencrypted. The security engine 420 may decrypt the configuration data as it is read out from the NVM 450 in order to configure portions of the PLD.

While some implementations may provide one or more complete images of configuration data, such that the secure PLD 410 is configured from one image, other implementations may allow partial configuration or reconfiguration of the secure PLD 410. In such situations, the secure PLD 410 may further implement an authorization framework, in which a particular portion of configuration data can authorized to configure a particular portion of the secure PLD 410. While some implementations may provide a programmable logic fabric, which are configured by configuration data, the elements and actions disclosed herein also can be applied to firmware or software provided to a secure PLD which includes a processor (e.g., other IC modules 480) that can execute instructions, such as a RISC core. Such approaches also can be applied to settings data that may be provided for hard functional blocks in the secure PLD. As such, it should be understood that a secure PLD is not simply or only a programmable logic portion of a device or system, in that some implementations may provide integration of other functional elements for which these authentication, integrity, and/or authorization checks can be conducted.

Some implementations may further provide a capability to have multiple distinct boot images, and in them, should a dry-run fail, then another image, which has already been validated may be selected for use. In a case where there are two images, a boot or initialization process can include determining which images are flagged as validated, and then determining which of the flagged images is most recent. Series or recency information can be provided by a source of configuration data, or can be generated by the secure PLD 410, or both. For example, a source can maintain a monotonically increasing counter that identifies each image version. In many situations, there would be only one source of configuration data for the secure PLD 410, and so it would be straight forward to maintain such information. In various embodiments, a "dry run" or pre-authentication process can be conducted for a bitstream that is received, and this dry run can include verifying a source (such as through a certificate or private key mechanism) of the bitstream, as well as conducting integrity checks on the bitstream (such as whether it was modified—such modifications can have occurred by intent or by accident —such as by an attempt to compromise the bitstream, or by transmission errors, for example). These features can be accomplished by different combinations of implementations. For example, in one embodiment, the secure PLD 410 may be configured to generate public/private key pairs and can therefore provide a public key to a source of a bitstream, and that source can encrypt data to be transmitted back to the secure PLD 410 using that public key. Such public key could be exchanged using a key exchange algorithm or could be extracted from secure PLD 410 during initial configuration. Such public/private key pair could be updated or renewed in a deployed device. Such data can include a keyed HMAC of a bitstream, for example. While an unkeyed hash can provide indicia of bitstream integrity, a keyed HMAC, such as keying the hash with the private key of the source, provides authentication given that secure PLD 410 can use the public key of the source to authenticate. It may also be the case that a shared secret key can be used to key the hash.

In some implementations, the bitstream may be encrypted, and if so the HMAC can be over the unencrypted or encrypted bitstream, although it may be preferred that the HMAC is over the encrypted bitstream. The bitstream may be encrypted with a symmetric key that is a shared secret with between the bitstream source and the secure PLD 410. The symmetric key may be provided to the secure PLD 410 encrypted using the public key provided by the secure PLD 410. In other implementations, a shared secret key may be supplied to the secure PLD 410 via a secure communication channel, and/or in a secure facility. In such situations, the shared secret key may be used to encrypt a hash of the bitstream, for decryption and comparison in the secure PLD 410. The bitstream itself may or may not be encrypted. Other implementations may use an approach to encryption that integrates an authentication mechanism. Depending on choice of encryption and authentication approaches, an initialization vector or nonce may also be required for initializing or salting the HMAC.

In an example, a method for secure loading of configuration data in a programmable logic device provides for a configuration source to encrypt, using a symmetric secret key, configuration data (a bulk encryption). Then, a message authentication protocol (e.g., a hash) is performed on the encrypted configuration source to generate a cleartext signature. That cleartext signature is encrypted with a public key of the programmable logic device. The symmetric secret key may be included in that encrypted package. The secure PLD 410 receives the bulk encrypted configuration data and the encrypted package. It decrypts using its private key corresponding to the public key, the encrypted package to obtain the cleartext signature and optionally the symmetric key. The secure PLD 410 hashes the received bulk encrypted configuration data to generate a second hash and compares that with the cleartext signature. If there is a match, then the secure PLD 410 can trust the authenticity of the configuration data and can store it in encrypted form, along with the symmetric key, or can decrypt and store the configuration data. The secure PLD 410 conducts, at this time, other pre-use checks on the configuration data, but does not actually configure the secure PLD 410 with the configuration data. After passing the pre-use checks and determining that the produced and received hashes match, the secure PLD 410 sets a status or flag that indicates that the configuration data/image has been pre-authenticated. Therefore, when the configuration data is to be used to configure the secure PLD 410, it can be loaded without regenerating the hash and performing the comparison.

In another example, a digest or hash of the configuration data can be signed by the private key of a source of the configuration data. The configuration data itself can be encrypted or unencrypted (and the digest can be over the encrypted or cleartext data, although it is preferred to be taken over the encrypted data). If encrypted, the encryption may be a bulk encryption that uses a symmetric key that is shared with secure PLD 410 by encrypted it with a public key corresponding to a private key held by secure PLD 410. The private key can be unique to secure PLD 410 or can be shared among a number of secure PLDs.

Figure 13:
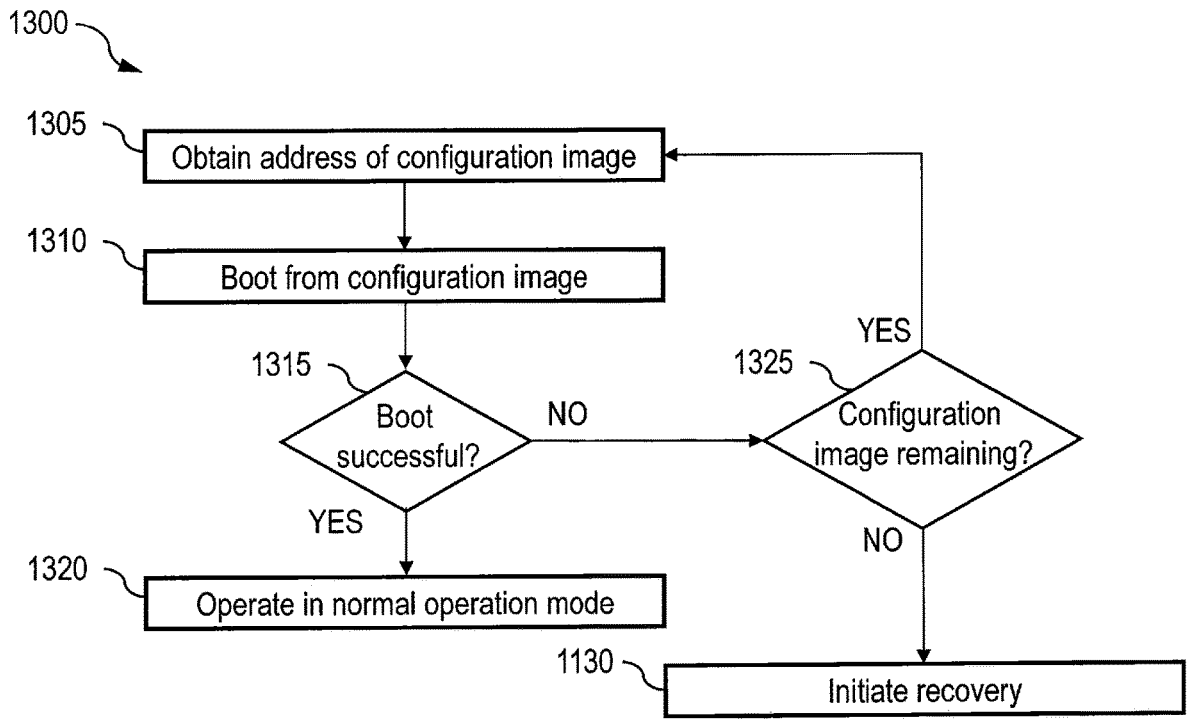
FIG. 13 illustrates a process for facilitating fallback booting in accordance with an embodiment of the disclosure.

FIG. 13 illustrates a process 1300 for facilitating fallback booting in accordance with an embodiment of the disclosure. In some embodiments, the operations of FIG. 13 may be implemented as software instructions executed by one or more logic devices associated with corresponding electronic devices, modules, processes, and/or structures depicted in FIGS. 1-12. More generally, the operations of FIG. 13 may be implemented with any combination of software instructions and/or electronic hardware (e.g., inductors, capacitors, amplifiers, actuators, or other analog and/or digital components). It should be appreciated that any step, sub-step, sub-process, or block of the process 1300 may be performed in an order or arrangement different from the embodiments illustrated by FIG. 13. For example, in other embodiments, one or more blocks may be omitted from the process 1300, and other blocks may be included. Furthermore, block inputs, block outputs, various sensor signals, sensor information, calibration parameters, and/or other operational parameters may be stored to one or more memories prior to moving to a following portion of the process 1300. Although the process 1300 is described with reference to systems, devices, processes, and elements of FIGS. 1-12, the process 1300 may be performed by other systems, devices, and elements, and including a different selection of electronic systems, devices, elements, assemblies, and/or arrangements. At the initiation of the process 1300, various system parameters may be populated by prior execution of a process similar to the process 1300, for example, or may be initialized to zero and/or one or more values corresponding to typical, stored, and/or learned values derived from past operation of the process 1300, as described herein.

At block 1305, the SPB 1030 obtains an address of a customer configuration image stored in the SRI memory 1080. The SPB 1030 may receive, from the main root of trust 1050, the address and an indication of which configuration image (e.g., configuration image 0 or 1) used to boot the die 1015. The configuration image used to boot the die 1015 determines the customer configuration image used to program the die 1010. At block 1310, the SPB 1030 fetches the customer configuration image based on the address and performs a boot procedure using the customer configuration image. At block 1315, a determination is made as to whether the boot procedure is successful. If the boot procedure is determined to be successful, the process 1300 proceeds to block 1320. At block 1320, the multi-chip module system 1005 operates in a normal operation mode.

If the boot procedure is determined to not be successful, the process 1300 proceeds to block 1325. In some cases, a negative-acknowledgement may be sent. At block 1325, a determination is made as to whether there are additional configuration images to boot from. In some cases, for example, a customer may have two firmware images. The main root of trust 1055 may log a fault and allow booting from other configuration. If the determination is that there are additional configuration images to boot from, the process 1300 proceeds to block 1305. If the determination is that there are no more available configuration images, the process 1300 proceeds to block 1330. At block 1330, the main root of trust 1055 and the control PLD 1065 initiate recovery (e.g., from a BMC) and log fault.

Figure 14:
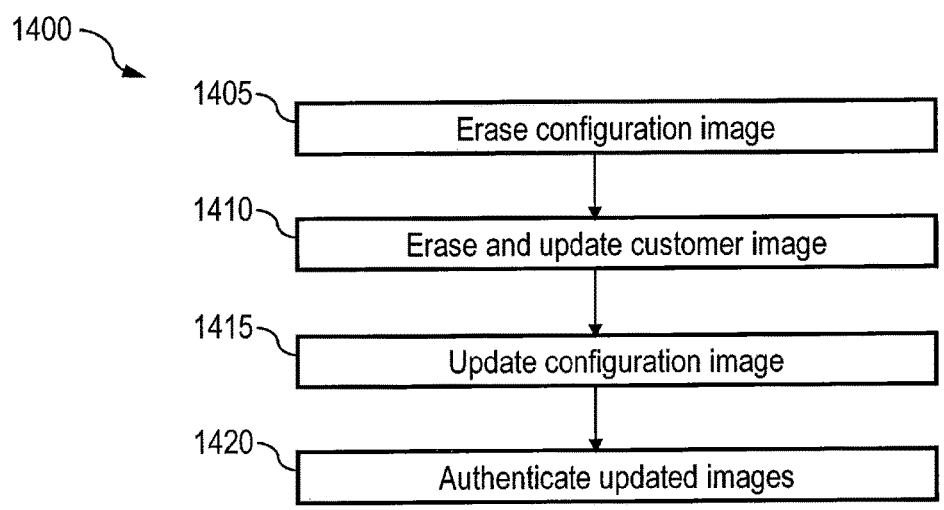
FIG. 14 illustrates a process for facilitating updating of a configuration image.

FIG. 14 illustrates a process 1400 for facilitating updating of configuration images for the die 1015 and the die 1010. In this regard, an update to a configuration image for the die 1015 is generally associated with an update to a customer configuration image for the die 1010, and vice versa. As an example, the user may generate or obtain (e.g., download from the Internet) an update to the configuration for the die 1010.

In some embodiments, the operations of FIG. 14 may be implemented as software instructions executed by one or more logic devices associated with corresponding electronic devices, modules, processes, and/or structures depicted in FIGS. 1-13. More generally, the operations of FIG. 14 may be implemented with any combination of software instructions and/or electronic hardware (e.g., inductors, capacitors, amplifiers, actuators, or other analog and/or digital components). It should be appreciated that any step, sub-step, sub-process, or block of the process 1400 may be performed in an order or arrangement different from the embodiments illustrated by FIG. 14. For example, in other embodiments, one or more blocks may be omitted from the process 1400, and other blocks may be included. Furthermore, block inputs, block outputs, various sensor signals, sensor information, calibration parameters, and/or other operational parameters may be stored to one or more memories prior to moving to a following portion of the process 1300. Although the process 1400 is described with reference to systems, devices, processes, and elements of FIGS. 1-13, the process 1400 may be performed by other systems, devices, and elements, and including a different selection of electronic systems, devices, elements, assemblies, and/or arrangements. At the initiation of the process 1400, various system parameters may be populated by prior execution of a process similar to the process 1400, for example, or may be initialized to zero and/or one or more values corresponding to typical, stored, and/or learned values derived from past operation of the process 1400, as described herein.

At block 1405, the configuration image for configuring the die 1015 is erased. At block 1410, the customer image corresponding to the configuration image erased at block 1405 is erased and updated. If this customer image is considered as a root of trust and does not change regardless of which configuration image is used to configure the die 1015, block 1410 is optional. At block 1415, the configuration image is updated. At block 1420, authentication of the updated configuration image is initiated at the die 1015 and authentication of the updated customer image is initiated at the die 1010. The update is complete if both authentications succeed. If the update fails, the configuration image for configuring the die 1015 is erased and a failure sent to a BMC.

Figure 15:
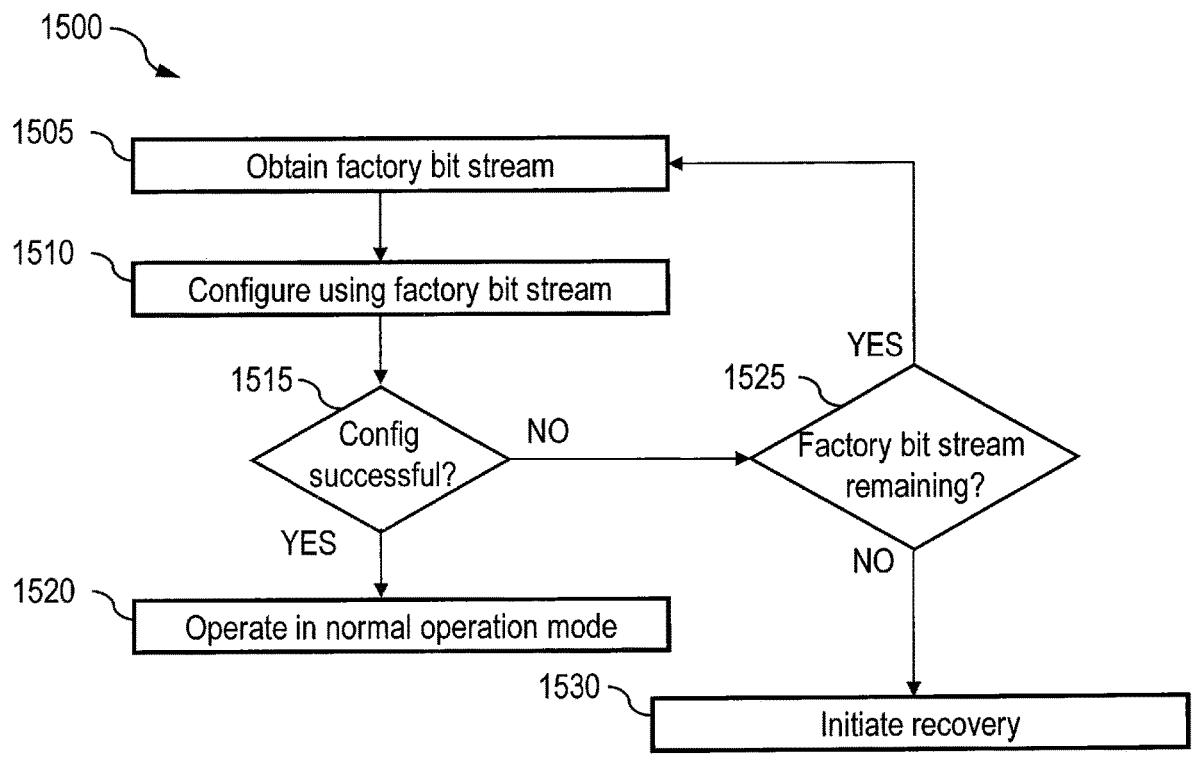
FIG. 15 illustrates a process for facilitating fallback configuration in accordance with an embodiment of the disclosure.
Figure 16:
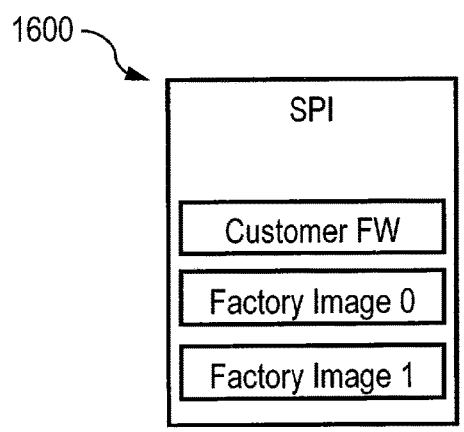
FIG. 16 illustrates an example memory that stores factory bit streams in accordance with an embodiment of the disclosure.

FIG. 15 illustrates a process 1500 for facilitating fallback configuration in accordance with an embodiment of the disclosure. FIG. 16 illustrates an example BMC SPI 1600 that stores factory bit streams associated with the die 1010 in accordance with an embodiment of the disclosure. For explanatory purposes, FIG. 15 is described with reference to the BMC SPI 1600.

In some embodiments, the operations of FIG. 15 may be implemented as software instructions executed by one or more logic devices associated with corresponding electronic devices, modules, processes, and/or structures depicted in FIGS. 1-14. More generally, the operations of FIG. 15 may be implemented with any combination of software instructions and/or electronic hardware (e.g., inductors, capacitors, amplifiers, actuators, or other analog and/or digital components). It should be appreciated that any step, sub-step, sub-process, or block of the process 1500 may be performed in an order or arrangement different from the embodiments illustrated by FIG. 15. For example, in other embodiments, one or more blocks may be omitted from the process 1500, and other blocks may be included. Furthermore, block inputs, block outputs, various sensor signals, sensor information, calibration parameters, and/or other operational parameters may be stored to one or more memories prior to moving to a following portion of the process 1500. Although the process 1500 is described with reference to systems, devices, processes, and elements of FIGS. 1-14, the process 1500 may be performed by other systems, devices, and elements, and including a different selection of electronic systems, devices, elements, assemblies, and/or arrangements. At the initiation of the process 1500, various system parameters may be populated by prior execution of a process similar to the process 1500, for example, or may be initialized to zero and/or one or more values corresponding to typical, stored, and/or learned values derived from past operation of the process 1500, as described herein.

At block 1505, the die 1010 obtains a factory configuration bit stream. An address associated with the factory configuration bit stream may be sent by the main root of trust 1055 using an SPI interface. The die 1010 may automatically authenticate the address and fetch the factory configuration bit stream from the BMC SPI 1600. At block 1510, the die 1010 is configured using the factory configuration bit stream. At block 1515, a determination is made as to whether the configuration procedure is successful. If the configuration procedure is determined to be successful, the process 1500 proceeds to block 1520. At block 1520, the die 1010 operates in a normal operation mode.

If the configuration procedure is determined to not be successful, the process 1500 proceeds to block 1525. At block 1525, a determination is made as to whether there are additional factory bit streams for use in configuring the die 1010. If the determination is that there are additional factory bit streams, the process 1500 proceeds to block 1505. In this regard, the main root of trust 1055, if time out, may cause booting from another factory configuration bit stream and send an address of the other factory configuration bit stream to the die 1010. If the determination is that there are no available factory bit streams, the process 1500 proceeds to block 1530. At block 1530, recovery (e.g., from a BMC) is initiated.

In some embodiments, field updates may be made to one of the factory bit streams. The other factory bitstream may provide a safe previous bit stream to fall back to if needed. Such a fallback provides robustness to the field upgradable portion by allowing fallback if anything goes wrong while allowing for the field upgradable portion of the factory bit stream to appear hardened. Factory bit streams may be erased and updated. In some cases, to initiate a new image update into the die 1010, a restart of the multi-chip module system 1005 may be initiated through an 00B command.

Figure 17:
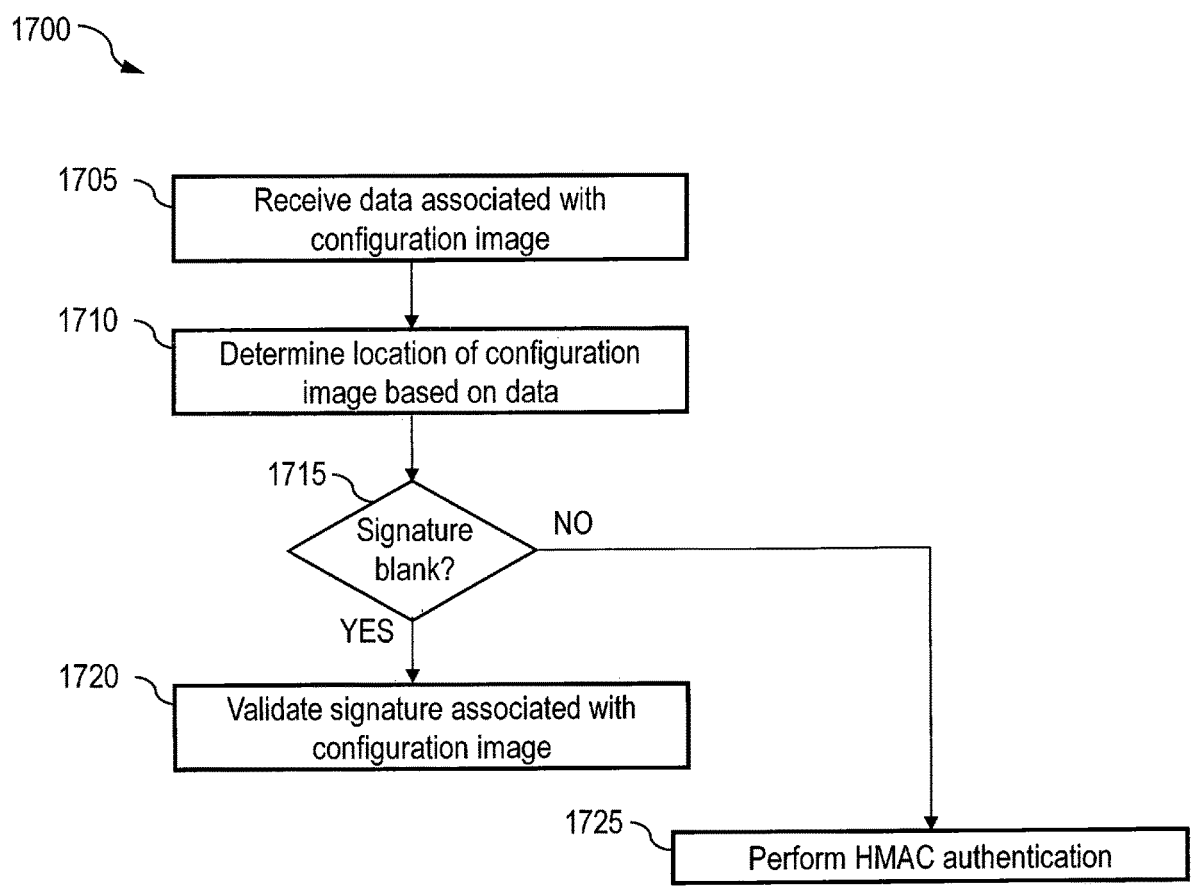
FIG. 17 illustrates a flow diagram of an example process for authenticating an image as part of a boot process in accordance with an embodiment of the disclosure.

FIG. 17 illustrates a flow diagram of an example process 1700 for authenticating a customer firmware image (e.g., a customer PFR firmware image) in accordance with an embodiment of the disclosure. The process 1700 may be performed after the die 1015 is booted from its configuration image and the die 1010 is booted from its factory configuration image.

In some embodiments, the operations of FIG. 17 may be implemented as software instructions executed by one or more logic devices associated with corresponding electronic devices, modules, processes, and/or structures depicted in FIGS. 1-16. More generally, the operations of FIG. 17 may be implemented with any combination of software instructions and/or electronic hardware (e.g., inductors, capacitors, amplifiers, actuators, or other analog and/or digital components). It should be appreciated that any step, sub-step, sub-process, or block of the process 1700 may be performed in an order or arrangement different from the embodiments illustrated by FIG. 17. For example, in other embodiments, one or more blocks may be omitted from the process 1700, and other blocks may be included. Furthermore, block inputs, block outputs, various sensor signals, sensor information, calibration parameters, and/or other operational parameters may be stored to one or more memories prior to moving to a following portion of the process 1700. Although the process 1700 is described with reference to systems, devices, processes, and elements of FIGS. 1-16, the process 1700 may be performed by other systems, devices, and elements, and including a different selection of electronic systems, devices, elements, assemblies, and/or arrangements. At the initiation of the process 1700, various system parameters may be populated by prior execution of a process similar to the process 1700, for example, or may be initialized to zero and/or one or more values corresponding to typical, stored, and/or learned values derived from past operation of the process 1700, as described herein.

At block 1705, the die 1010 receives data from the die 1015 associated with programming from a customer firmware image. The data may be received from the main root of trust 1055 and may include a configuration version number associated with the die 1015, a boot source (e.g., configuration 0 or configuration 1) used to boot the die 1015, a customer public key, and a PFR firmware location (e.g., a top of the PFR firmware location). At block 1710, the die 1010 determines an actual PFR firmware SRI location based on the boot source and the PFR firmware location from the die 1015. At block 1715, the die 1010 reads for an HMAC signature at a firmware HMAC signature location of the SRI memory 1080 that stores the customer firmware image to determine whether the HMAC signature is blank or not blank. In some aspects, the HMAC signature location may be blank if no prior authentication of this customer firmware image has been performed and not blank if a prior authentication of this customer firmware image has been performed, as further described herein.

If blank (e.g., no HMAC signature is present), the process 1700 proceeds to block 1720. At block 1720, the die 1010 reads the PFR firmware image, calculates a hash value (e.g., using SHA-256) based on the PFR firmware image, and validates a signature associated with the customer PFR firmware image using the customer public key. If not blank, the process 1700 proceeds to block 1725. At block 1725, the die 1010 performs HMAC authentication to authenticate the customer PFR firmware image (including its signature) based on the configuration version number associated with the die 1015 and a unique device secret (UDS). In some embodiments, blocks 1705, 1710, 1715, 1720, and/or 1725 may be performed by a secure enclave (SE) of the die 1010. The SE may include various processors (e.g., RISC-V-based processors), crypto-accelerator blocks, and so forth. The SE may include or may be a part of the security engine 420, the cryptographic block 1040, and/or other hardened security engine/embedded security block.

Figure 18:
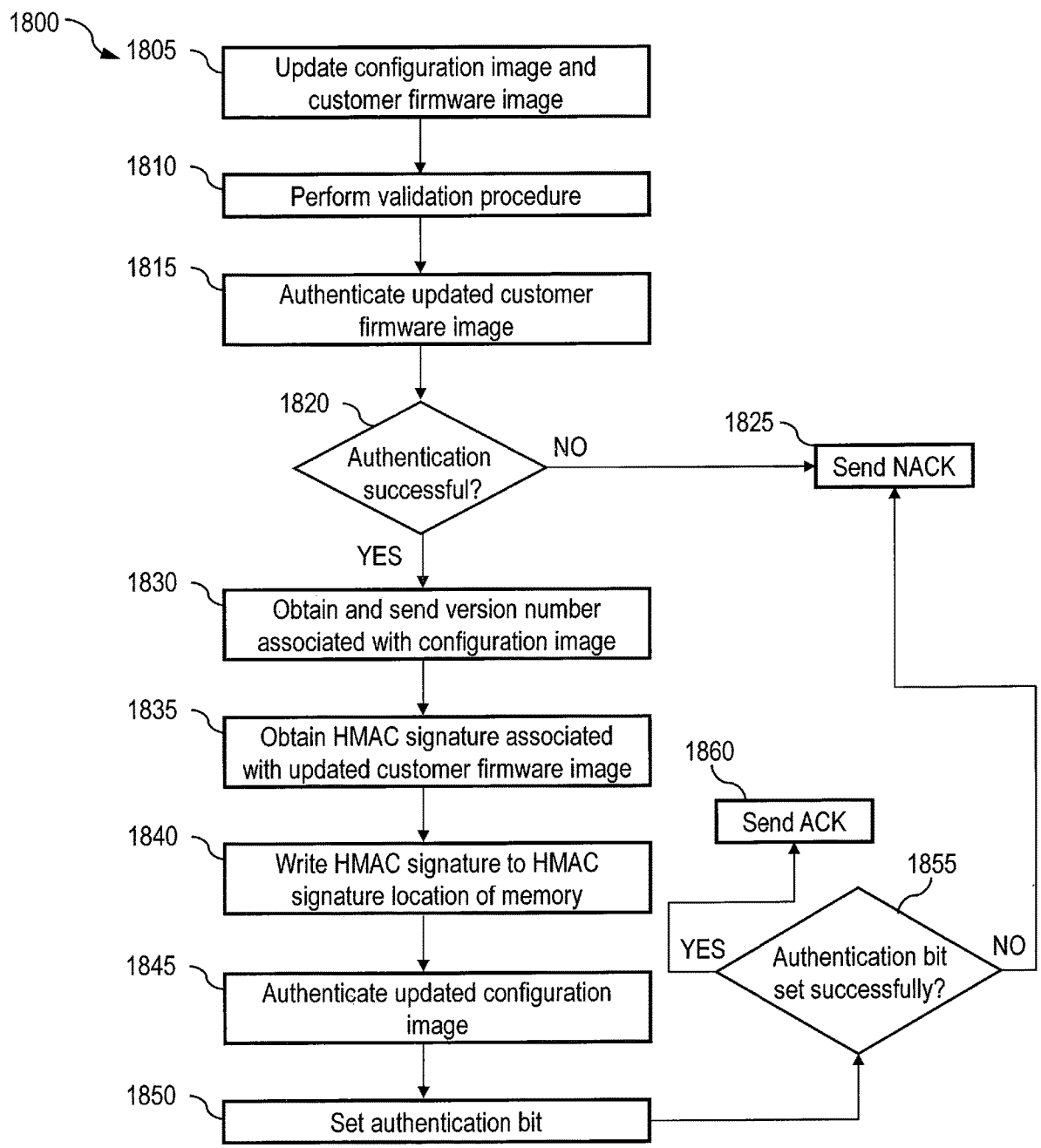
FIG. 18 illustrates a flow diagram of an example process for updating a customer firmware image in accordance with an embodiment of the disclosure.

FIG. 18 illustrates a flow diagram of an example process 1800 for updating a customer firmware image in accordance with an embodiment of the disclosure. In some embodiments, the operations of FIG. 18 may be implemented as software instructions executed by one or more logic devices associated with corresponding electronic devices, modules, processes, and/or structures depicted in FIGS. 1-17. More generally, the operations of FIG. 18 may be implemented with any combination of software instructions and/or electronic hardware (e.g., inductors, capacitors, amplifiers, actuators, or other analog and/or digital components). It should be appreciated that any step, sub-step, sub-process, or block of the process 1800 may be performed in an order or arrangement different from the embodiments illustrated by FIG. 18. For example, in other embodiments, one or more blocks may be omitted from the process 1800, and other blocks may be included. Furthermore, block inputs, block outputs, various sensor signals, sensor information, calibration parameters, and/or other operational parameters may be stored to one or more memories prior to moving to a following portion of the process 1800. Although the process 1800 is described with reference to systems, devices, processes, and elements of FIGS. 1-17, the process 1800 may be performed by other systems, devices, and elements, and including a different selection of electronic systems, devices, elements, assemblies, and/or arrangements. At the initiation of the process 1800, various system parameters may be populated by prior execution of a process similar to the process 1800, for example, or may be initialized to zero and/or one or more values corresponding to typical, stored, and/or learned values derived from past operation of the process 1800, as described herein.

The BMC 1070 initiates a configuration and PFR firmware update. As an example, the user may generate or download data that initiates updating of the customer firmware image. An update to the customer firmware image is associated with an update to a configuration image from which the die 1015 booted that corresponds to the customer firmware image. At block 1805, the customer firmware image and the configuration image are updated by the BMC 1070/the processor 1035 using a method determined by the system 1000. At block 1810, the BMC 1070 initiates a validation procedure after the update is complete.

At block 1815, the processor 1035 authenticates the newly updated customer PFR firmware. In some cases, the authentication may include streaming the customer PFR firmware for hash (e.g., SHA-256) to the SE of the die 1010 and reading a PFR firmware signature from the SPI memory 1080 and sending it to the SE, and the SE uses the stored customer public key to authenticate the hash against the PFR signature in the SPI memory 1080. In such cases, the authentication is successful if the signature check of the customer PFR firmware by the SE passes.

At block 1820, a determination is made (e.g., by the SE) as to whether the authentication is successful. If the authentication is determined to have failed, the process 1800 proceeds to block 1825. At block 1825, the processor 1035 sends a negative-acknowledgement to the BMC 1070 and the update is considered to have failed. If the authentication is determined to have succeeded, the process 1800 proceeds to block 1830. At block 1830, the processor 1035 obtains and sends a version number associated with the configuration image and sends to the SE of the die 1010.

At block 1835, the processor 1035 obtains an HMAC signature associated with the updated customer firmware image. The processor 1035 may stream the updated customer firmware image to the SE for PFR firmware HMAC signature calculation and then read the newly calculated PFR firmware HMAC signature. At block 1840, the processor 1035 writes the newly calculated PFR firmware HMAC signature into a PFR firmware HMAC signature location in the SPI memory 1080 that stores one or more customer firmware images. As provided above (e.g., with respect to blocks 1715, 1720, and 1725 of the process 1700 of FIG. 17), the PFR firmware HMAC signature location having an HMAC signature is indicative of the updated customer firmware image having been successfully authenticated. Subsequently, when this updated customer firmware image is used to program the die 1010, a faster authentication may be performed when the HMAC signature is not blank relative to when the HMAC signature is blank.

At block 1845, the die 1015 authenticates the configuration image. At block 1850, the processor 1035 initiates setting of an authentication bit indicative of whether the authentication of the configuration image is successful. At block 1855, a determination is made (e.g., by the processor 1035) as to whether the authentication bit is set successfully (e.g., indicative of whether the authentication of the configuration image is successful or not successful). If the authentication bit is determined to be successfully set, the process 1800 proceeds to block 1860. At block 1860, the processor 1035 sends an acknowledgement to the BMC 1070. If the authentication bit is determined to not be successfully set, the process 1800 proceeds to block 1825. At block 1825, the processor 1035 sends a negative-acknowledgement to the BMC 1070 and the update is considered to have failed.

When a device boots up, the device needs to authenticate. As authentication may take a relatively long time during a boot process (e.g., milliseconds to hundreds of milliseconds), authentication every time the device is booted is generally undesirable. Authentication may be performed once (e.g., when time can be afforded), and then hereafter the device is authenticated to speed up subsequent authentications. In this regard, once a successful authentication is done, information indicative of the successful authentication may be stored so that authentication can be skipped when the device is booted next time and the information indicative of the prior successful authentication is read. If tampering is detected, a prior authentication done indicator may be ignored and a new, whole authentication process is performed. With regard to the process 1800 of FIG. 18, the prior authentication done indicator associated with the updated customer PFR firmware image is the HMAC signature in the HMAC signature location of the memory 1080 whereas the prior authentication done indicator associated with the configuration image for the die 1015 is the authentication bit.

The multi-chip module systems according to embodiments herein provide platform root of trust. On-chip logic may dynamically minimize an attack surface area. The on-chip logic may provide self detection, self recovery, and/or self protection. For detection, the on-chip logic may include logic to detect when platform firmware code and/or critical data has been corrupted. Data may include pieces of information that platform firmware code uses to carry out its operation, as instructed by the code. Critical data may include configuration settings and policies that may be needed to be in a valid state for the device to maintain its security posture. Critical data may be used for various purposes, including configuration settings and policies. The configuration settings may include data that tells the code how to configure operational aspects of the device. The operational aspects may include enabling a peripheral that is disallowed by enterprise security policies and/or a table of non-functional sectors in a hard drive. The policies may include data that tells the code what path to take or how to respond. Such data may include a system's boot order describes the valid devices to attempt to boot from as well as the order. Such data may include an UEFI secure boot (e.g., a set of security configurations controlling which third party code the BIOS will hand control to). Non-critical data may include all other data.

For self detection, an on-chip configuration image may be authenticated by an immutable security engine (e.g., the security engine 420 or 1105 implemented on the die 1010 and/or 1015) before boot. The security engine may use a public key stored on chip (e.g., with encryption support). For recovery, the on-chip logic may include logic to restore platform firmware code and/or critical data to a state of integrity in the event that any such firmware code or critical data are detected to have been corrupted, or when forced to recover through an authorized mechanism. For self recovery, the on-chip logic may automatically switch over to another authenticated image if authentication fails. For protection, the on-chip logic may include logic to ensure that platform firmware code and critical data remain in a state of integrity and are protected from corruption, such as the process for ensuring the authenticity and integrity of firmware updates. For self protection, the on-chip logic may prevent configuring from a compromised image. A fabric logic may control access from programming ports. A logic policy may be in place to separate access rights for each flash store. The fabric may communicate with an external controller through an out-of-band communication interface. Permanent Denial of service (PDoS) attacks (e.g., erasing/corrupting both images) may be block. Attacks from all configuration ports may be blocked during in-transit.

Figure 19:
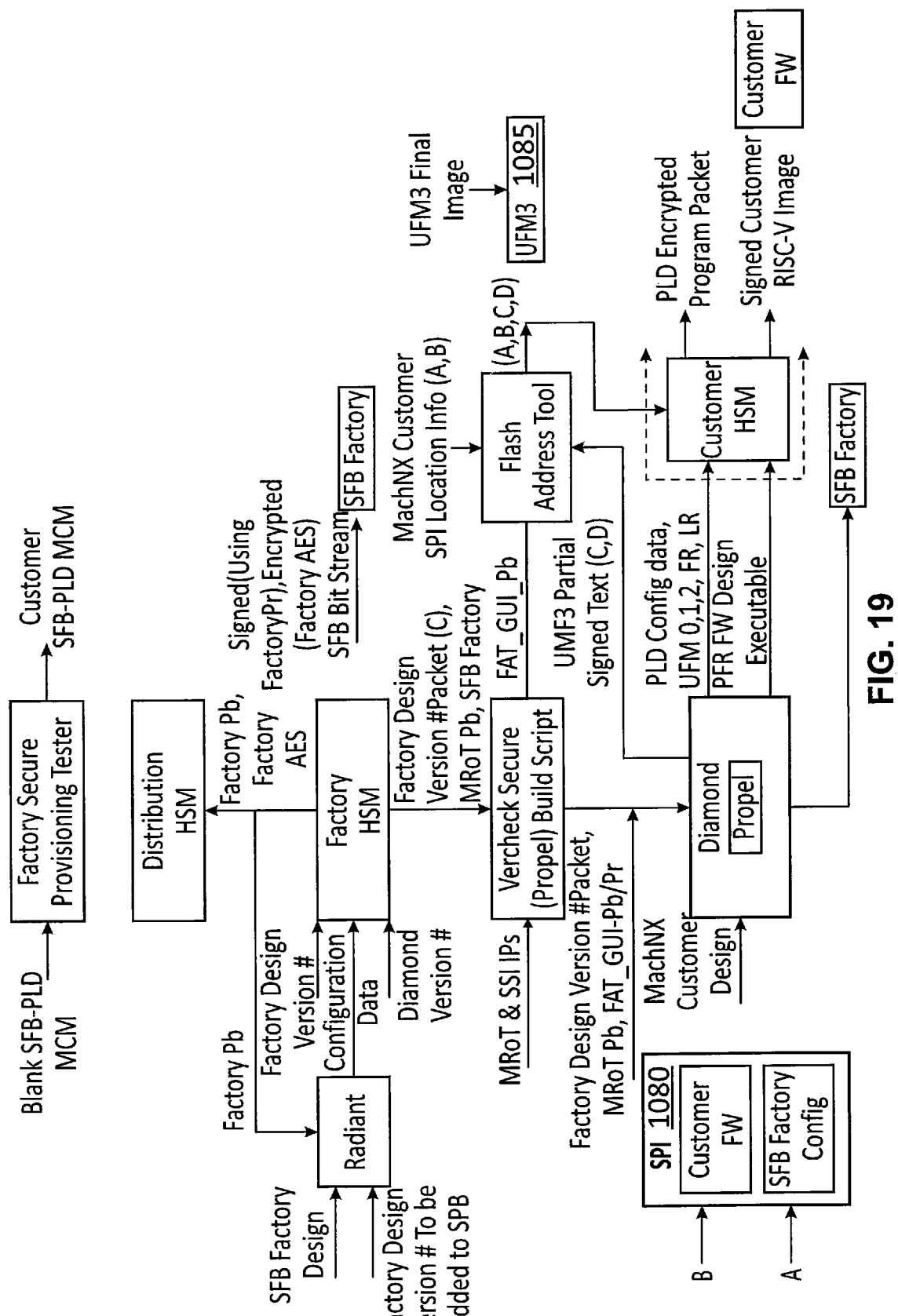
FIG. 19 illustrates a chain of trust and key management associated with the multi-chip module system of FIG. 10 in accordance with an embodiment of the disclosure.

FIG. 19 illustrates a chain of trust and key management associated with the multi-chip module system 1005 of FIG. 10 in accordance with an embodiment of the disclosure. Radiant may generate an SFB configuration bitstream based on an SFB factory design and provide the bitstream to a factory HSM. The factory HSM stores factory keys. The factory keys may be used to sign and encrypt the bitstream from Radiant. The factory HSM may also generate a version number packet that is partly signed by factory. Certain public keys may be generated responsive to instantiations when the user uses the die 1015. A main root of trust public key and customer design are provided to the Diamond/Propel tool flow. When the user creates their design for the die 1015, the main root of trust 1055 and the security interface 1060 of the die 1015 may be instantiated with information such as the main root of trust public key. In this regard, factory logic is added to the customer's design/logic. A flash address tool provides data for storage in the UFM3 1085 of the die 1015. The data stored in the UFM3 1085 may include a start address (denoted as A in FIG. 19) of the SFB-factory configuration image, a start address (denoted as B) of the customer image in the SPI flash memory 1080, an approved version number packet (denoted as C) associated with the die 1010, and PFR engine configuration data (denoted as D) associated with the die 1010. The start addresses of the SFB-factory configuration image and the customer image may come from the user (e.g., based on how the user organizes the SPI memory 1080). The version number packet and the PFR engine configuration data are from the factory. The version number packet associated with the die 1010 includes encrypted data associated with the die 1010, a hash of a factory public key and a factory image signature associated with the die 1010, a version number of Diamond that the version number packet is provisioned in, a signature of this packet that can be verified by a public key that is provisioned into the main root of trust 1055.

In some embodiments, in order to allow a user to securely treat the die 1010 as, or as providing, a fixed function block, the die 1010 has to be protected from potential tampering and/or attacks due to its programmable nature. A scheme of trust is provided via various keys (e.g., encryption keys, authentication keys). Manufacturer (e.g., PLD manufacturer) data and customer configuration data are protected. As examples, the data to be protected from tampering and attacks may include a bitstream used to configure programmable components provided on the die 1010 and configuration data stored in the die 1015 (e.g., flash memory of the die 1015). The configuration data stored in the die 1015 may include configuration data defined by the manufacturer as well as configuration data defined by the user. Manufacturer data may be protected using a set of encryption and authentication keys. A customer HSM may be used to protect the user-defined configuration data using the user's keys.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A multi-chip module system for providing an integrated programmable logic functionality and security functionality, the multi-chip module system comprising:
   a first die comprising a programmable logic device configured to provide at least a portion of the programmable logic functionality;
   a second die comprising a security engine configured to perform at least a portion of the security functionality, wherein the security engine is configured to:
      receive, from the first die, data associated with a first configuration image and a second configuration image;
      perform a first read operation on a memory for the second configuration image based on the data; and
      authenticate the second configuration image; and
   a configuration engine configured to program the programmable logic device according to the first configuration image, wherein the configuration engine is disposed within the first die and/or the second die.

2. The multi-chip module system of claim 1, wherein the first die is configured to implement a root of trust element for both the first die and the second die, wherein the second die is configured to receive the data from the root of trust element, wherein the first die comprises user logic configured to control input/output ports of the first die, wherein the second die comprises an application-specific integrated circuit (ASIC) to implement the security engine, wherein both the first die and the second die include a programmable logic fabric, and wherein one of the first die or second die implements a processor configured to control operation of functionality in both the first die and the second die.

3. The multi-chip module system of claim 1, wherein:
   the first die is configured to implement a root of trust element for both the first die and the second die;
   the second configuration image comprises a firmware image;
   the second die further comprises a programmable logic fabric configured to receive the data from the root of trust element;
   the configuration engine is further configured to
      program the programmable logic fabric of the second die using a third configuration image, wherein the third configuration image includes user-generated functionality and functionality determined by a system builder; and
      program the second die according to the firmware image after programming the second die according to the third configuration image.

4. The multi-chip module system of claim 1, wherein either the first die or the second die is configured with a soft processor configured to control functionality implemented in both the first die and the second die based on programming that does not differentiate whether a particular functionality is implemented in the first die or the second die, wherein the first die comprises a memory comprising platform firmware resiliency (PFR) configuration data associated with the second die, and wherein the second die comprises an input/output control block and a PFR block both configured to be programmed with the PFR configuration data stored in the memory of the first die.

5. The multi-chip module system of claim 1, wherein both the first die and the second die are configured to encrypt, sign and/or encrypt and sign messages across an interface between the first die and the second die, and wherein the data comprises a configuration version number associated with the first die, a boot source information associated with the first configuration image, a customer public key, and/or a memory location associated with the second configuration image.

6. The multi-chip module system of claim 1, wherein the first die and the second die are configured to communicate with each other using an out of band interface that does not carry user data and another interface that carries user data, wherein the second configuration image comprises an update configuration image, and wherein the security engine is further configured to determine a memory location associated with the second configuration image based on the data.

7. The multi-chip module system of claim 1, further comprising interfaces configured to allow the multi-chip module system to be configured and/or used as though the multi-chip module system contains one programmable logic die, wherein the first die and the second die share a substrate, and wherein the first die and the second die are configured to communicate with each other via a direct communication and without going through the substrate.

8. The multi-chip module system of claim 1, wherein the security engine is further configured to:
perform a second read operation on a predetermined memory location of the memory; and
authenticate the second configuration image based on one of a first signature or a second signature according to the second read operation, wherein the memory comprises an external flash memory.

9. The multi-chip module system of claim 8, wherein:
the second configuration image comprises a customer firmware image;
the first signature comprises a firmware signature;
the second signature comprises a hash message authentication code (HMAC) signature;
the first die comprises a control PLD block;
the second die further comprises a processor;
the security engine is configured to authenticate the second configuration image based on the first signature;
the security engine is further configured to:
receive the second configuration image from the processor; and
determine an HMAC signature based on the second configuration image;
the processor is configured to:
perform a third read operation on the security engine to obtain the HMAC signature; and
perform a write operation to write the HMAC signature into the predetermined memory location of the memory;
the processor is configured to be programmed according to the second configuration image when the second configuration image is successfully authenticated; and
the processor is configured to control the control PLD block of the first die through an inter-chip communication interface.

10. The multi-chip module system of claim 8, wherein:
the second configuration image comprises an update configuration image,
the security engine of the second die is further configured to determine a memory location associated with the second configuration image based on the data,
the first die comprises a security engine configured to:
authenticate the update configuration image associated with the second configuration image; and
set an authentication bit when authentication of the update configuration image is successful.

11. The multi-chip module system of claim 8, wherein:
the predetermined memory location is associated with a hash message authentication code (HMAC) signature,
the second configuration image is based on the first signature when the memory location is blank,
the second configuration image is based on the second signature when the memory location is not blank,
the second die further comprises a processor configured to be programmed based at least in part by the second configuration image, and
the processor is configured to:
stream the second configuration image to the security engine;
perform a third read operation to obtain the first signature from the memory; and
send the first signature to the security engine; and
the security engine is configured to:
determine a hash value associated with the second configuration image; and
authenticate the second configuration image based on the first signature and the hash value.

12. A method for configuring the multi-chip module system of claim 1, the method comprising:
receiving a user design;
synthesizing the user design into a plurality of programmable logic device components;
generating configuration data to configure physical components of the programmable logic device based on the synthesized user design; and
generating the first configuration image based on the configuration data and factory data indicative of a root of trust of the first die.

13. A method of operating for a multi-chip module system having an integrated programmable logic functionality and security functionality, the method comprising:
programming a programmable logic device of a first die of the multi-chip module system according to a first configuration image, wherein the programmable logic device provides at least a portion of the programmable logic functionality;
receiving, by a security engine of a second die of the multi-chip module system from the first die, data associated with the first configuration image and a second configuration image, wherein the security engine performs at least a portion of the security functionality;
performing, by the security engine, a first read operation on a memory for the second configuration image based on the data; and
authenticating, by the security engine, the second configuration image.

14. The method of claim 13, wherein the first die implements a root of trust element for both the first die and the second die, and wherein the receiving comprises receiving, by a programmable logic fabric of the second die, the data from the root of trust element, wherein the second configuration image comprises a firmware image, the method further comprising:
programming the programmable logic fabric of the second die according to a third configuration image; and programming the programmable logic fabric of the second die according to the firmware image after programming the second die according to the third configuration image.

15. The method of claim 13, wherein either the first die or the second die is configured with a soft processor configured to control functionality implemented in both the first die and the second die based on programming that does not differentiate whether a particular functionality is implemented in the first die or the second die, and wherein the data comprises a configuration version number associated with the first die, a boot source information associated with the first configuration image, a customer public key, and/or a memory location associated with the second configuration image.

16. The method of claim 13, wherein the first die and the second die communicate with each other using an out of band interface that does not carry user data and another interface that carries user data, wherein the first die and the second die share a substrate, wherein the first die and the second die communicate with each other via a direct communication and without going through the substrate, wherein both the first die and the second die include a programmable logic fabric, and wherein one of the first die or second die implements a processor configured to control operation of functionality in both the first die and the second die.

17. The method of claim 13, further comprising performing a second read operation on a predetermined memory location of the memory, wherein the authenticating is based on one of a first signature or a second signature according to the second read operation.

18. The method of claim 17, wherein the authenticating is based on the first signature, the method further comprising:
receiving, by the security engine from a processor of the second die, the second configuration image;
determining, by the security engine, a hash message authentication code (HMAC) signature based on the second configuration image;
performing, by the processor, a third read operation on the security engine to obtain the HMAC signature;
performing a write operation to write the HMAC signature into the predetermined memory location of the memory, wherein the processor is configured to be programmed according to the second configuration image when the second configuration image is successfully authenticated.

19. The method of claim 17, wherein the second configuration image comprises a customer firmware image, wherein the first signature comprises a firmware signature, wherein the second signature comprises a hash message authentication code (HMAC) signature, wherein the predetermined memory location is associated with the HMAC signature, wherein the second configuration image is based on the first signature when the memory location is blank, and wherein the second configuration image is based on the second signature when the memory location is not blank.

20. The method of claim 17, further comprising:
determining, by the security engine, a memory location associated with the second configuration image based on the data;
streaming, by a processor of the second die, the second configuration image to the security engine;
performing, by the processor, a third read operation to obtain the first signature from the memory;
sending, by the processor, the first signature to the security engine; and
determining, by the security engine, a hash value associated with the second configuration image,
wherein the authenticating is based on the first signature and the hash value, and wherein the processor is configured to be programmed at least in part by the second configuration image.

* * * * *

UNITED STATES PATENT AND TRADEMARK OFFICE
CERTIFICATE OF CORRECTION

PATENT NO. : 12,417,319 B2
APPLICATION NO. : 18/331114
DATED : September 16, 2025
INVENTOR(S) : Srirama Chandra et al.

It is certified that error appears in the above-identified patent and that said Letters Patent is hereby corrected as shown below:

In the Specification

Column 12, Line 17, change "a JTAG, I2C, SRI, and/or" to --a JTAG, I2C, SPI, and/or--.

Column 29, Lines 25-26, change "synchronous serial interface (551)" to --synchronous serial interface (SSI)--.

Column 29, Line 27, change "to the 551" to --to the SSI--.

Column 29, Line 64, change "stored in an SRI" to --stored in an SPI--.

Column 30, Line 1, change "stored in the SRI" to --stored in the SPI--.

Column 30, Lines 8-9, change "Selection between SRI and quad SRI (QSPI)" to --Selection between SPI and quad SPI (QSPI)--.

Column 30, Line 11, change "an SRI memory interface" to --an SPI memory interface--.

Column 30, Line 12, change "The SRI may" to --The SPI may--.

Column 30, Line 29, change "the SRI flash" to --the SPI flash--.

Column 30, Line 48, change "the SRI flash" to --the SPI flash--.

Column 30, Line 50, change "the SRI flash" to --the SPI flash--.

Column 31, Line 11, change "the external SRI flash" to --the external SPI flash--.

Column 32, Line 9, change "the 00B interface" to --the OOB interface--.

Signed and Sealed this
Twenty-eighth Day of October, 2025

John A. Squires
*Director of the United States Patent and Trademark Office*

Column 35, Line 28, change "an 00B channel." to --an OOB channel.--.

Column 41, Line 2, change "stored in the SRI memory" to --stored in the SPI memory--.

Column 43, Line 18, change "through an 00B command." to --through an OOB command.--.

Column 43, Line 63, change "firmware SRI location based" to --firmware SPI location based--.

Column 43, Line 66, change "location of the SRI" to --location of the SPI--.